(12) United States Patent
Kambegawa et al.

(10) Patent No.: US 11,551,343 B2
(45) Date of Patent: Jan. 10, 2023

(54) APPARATUS, METHOD, AND STORAGE MEDIUM

(71) Applicant: CANON KABUSHIKI KAISHA, Tokyo (JP)

(72) Inventors: Minoru Kambegawa, Chiba (JP); Yosuke Obayashi, Chiba (JP); Junichi Goda, Chiba (JP); Masanori Ichikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/159,885

(22) Filed: Jan. 27, 2021

(65) Prior Publication Data

US 2021/0241447 A1  Aug. 5, 2021

(30) Foreign Application Priority Data

Feb. 5, 2020  (JP) .............................. JP2020-017729

(51) Int. Cl.
*G06T 7/00*  (2017.01)
(52) U.S. Cl.
CPC ........ *G06T 7/0004* (2013.01); *G06T 2200/24* (2013.01); *G06T 2207/30144* (2013.01)
(58) Field of Classification Search
CPC ........ G06T 7/0004; G06T 2207/30144; G06V 10/993; G06V 10/44
See application file for complete search history.

(56) References Cited

U.S. PATENT DOCUMENTS

| | | | | |
|---|---|---|---|---|
| 2009/0123029 | A1* | 5/2009 | Harada | G06F 3/0421 382/106 |
| 2011/0199082 | A1* | 8/2011 | Kimura | A61B 5/0263 324/306 |
| 2012/0092275 | A1* | 4/2012 | Umetsu | G06F 21/36 345/173 |
| 2012/0300259 | A1* | 11/2012 | Hosaka | G11B 27/322 358/1.15 |
| 2016/0275304 | A1* | 9/2016 | Jiang | G06F 21/6218 |
| 2020/0097645 | A1* | 3/2020 | Tokie | G06F 21/6245 |
| 2020/0233618 | A1* | 7/2020 | Ayukawa | G06T 7/001 |

FOREIGN PATENT DOCUMENTS

JP  2010173289 A  8/2010

* cited by examiner

*Primary Examiner* — Sam Bhattacharya
(74) *Attorney, Agent, or Firm* — Canon U.S.A., Inc. IP Division

(57) ABSTRACT

An apparatus acquires a plurality of candidate correct answer images for generating a correct answer image that is used for image quality evaluation, and detects a candidate correct answer image to be excluded from the acquired plurality of candidate correct answer images, based on differences between the acquired plurality of candidate correct answer images.

16 Claims, 20 Drawing Sheets

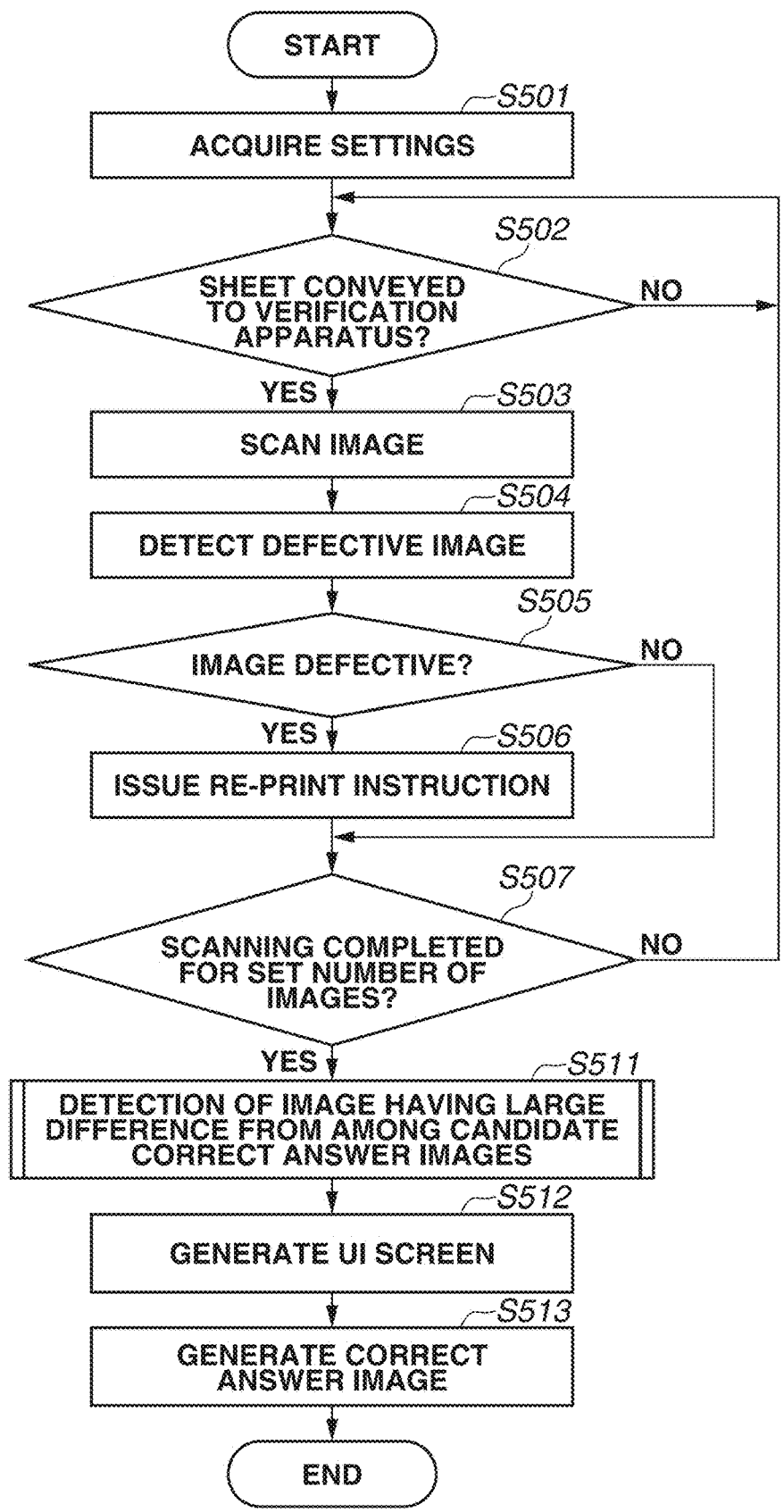

FIG.9

REGISTER CORRECT ANSWER IMAGE

NUMBER OF PAGES PER JOB: 1 — 801

SIDE TO BE VERIFIED — 802
- ☑ BOTH SIDES
- ☐ FRONT SIDE ONLY
- ☐ BACK SIDE ONLY

NUMBER OF IMAGES TO BE ACQUIRED: 3 — 803

START REGISTRATION — 804

FIG.16

VERIFICATION JOB SETTINGS

NUMBER OF JOBS

| 1000 | △▽ | ~1501 |

NUMBER OF JOBS FOR CORRECT ANSWER IMAGE REGISTRATION

| 3 | △▽ | ~1504 |

*1503*

| DISCHARGE DESTINATION | STACK TRAY |
|---|---|
| DISCHARGE DESTINATION FOR REJECTED SHEET | ESCAPE TRAY |

PRINT FOR CORRECT ANSWER IMAGE REGISTRATION ~1505

START PRINTING ~1508

CANCEL ~1509

FIG.20

APPARATUS, METHOD, AND STORAGE MEDIUM

BACKGROUND OF THE DISCLOSURE

Field of the Disclosure

The aspect of the embodiments relates to an apparatus, a method, and a storage medium.

Description of the Related Art

In recent years, there has been known a printing system in which a sheet subjected to printing by a printing apparatus can be verified by a verification apparatus during conveyance of the sheet. In the verification of the sheet subjected to printing, the verification apparatus scans the printed image of the conveyed sheet and then subjects the scanned image to image analysis to determine whether the sheet is appropriate. The verification apparatus is capable of detecting a barcode, a missing ruled line, a missing image, a print defect, a missing page, a color shift, and so on. If the verification apparatus determines that the sheet is defective, the defective sheet is discharged to a discharge tray different from that for non-defective sheets. This prevents the defective sheet from being mixed in non-defective sheets, allowing the operator to discard only the defective sheet.

As a method for generating a correct answer image (master image or reference image) that is used for the image analysis, there is known a method in which a print sheet subjected to printing in advance and having a sufficient quality as a correct answer image is scanned by a verification apparatus. Images to be used for generating a correct answer image are acquired by using a scan sensor that is on the verification apparatus and is used in the actual verification process. This can prevent erroneous determination in verification due to the sheet conveyance accuracy and the sensor scanning accuracy.

When the images to be used for generating a correct answer image are acquired, the print sheet to be scanned has a sufficient print quality as a correct answer image and that the print sheet is correctly scanned by the scan sensor. If paper dust on the print sheet attaches to the scan sensor of the verification apparatus, a streak may occur on the scanned image. If an image having a streak is used as a correct answer image, the scan sensor may incorrectly detect a print defect even when a print product has no defect.

A technique discussed in Japanese Patent Application Laid-Open No. 2010-173289 checks that no image defect occurs before and after acquiring the images to be used for generating a correct answer image, thereby determining that neither a print defect nor a scan defect occurs while acquiring the images to be used for generating a correct answer image. However, even if the above-described streak due to paper dust does not occur before and after the acquisition, a streak is likely to occur only during the acquisition. In addition, not all defects can be detected by applying a known defect detection algorithm such as streak detection algorithm. Accordingly, there has been an issue where a defective image may be mixed in candidate images for generating a correct answer image.

SUMMARY OF THE DISCLOSURE

According to an aspect of the embodiments, an apparatus includes a verification apparatus that scans a printed image of a conveyed recording medium and compares the scanned image with a preregistered correct answer image to determine whether the printed image is appropriate. The image forming apparatus further includes an acquisition unit configured to acquire a plurality of candidate correct answer images for generating the correct answer image, and a detection unit configured to detect a candidate correct answer image to be excluded from the acquired plurality of candidate correct answer images.

Further features of the disclosure will become apparent from the following description of exemplary embodiments with reference to the attached drawings.

BRIEF DESCRIPTION OF THE DRAWINGS

FIG. 5 is a flowchart illustrating information processing performed by a verification apparatus when a correct answer image is registered.

FIG. 9 is a diagram illustrating an example of a screen displayed on the display unit of the verification apparatus when a correct answer image is registered.

FIG. 16 is a diagram illustrating an example of a verification job settings screen displayed on a display of an external controller.

FIG. 20 is a diagram illustrating replacement of an image.

DESCRIPTION OF THE EMBODIMENTS

Exemplary embodiments of the disclosure will be described below with reference to the accompanying drawings. In the following description, an external controller may be referred to as an image processing controller, a digital front end (DFE), or a print server. An image forming apparatus may be referred to as a multifunction peripheral (MFP).

Figure 1:
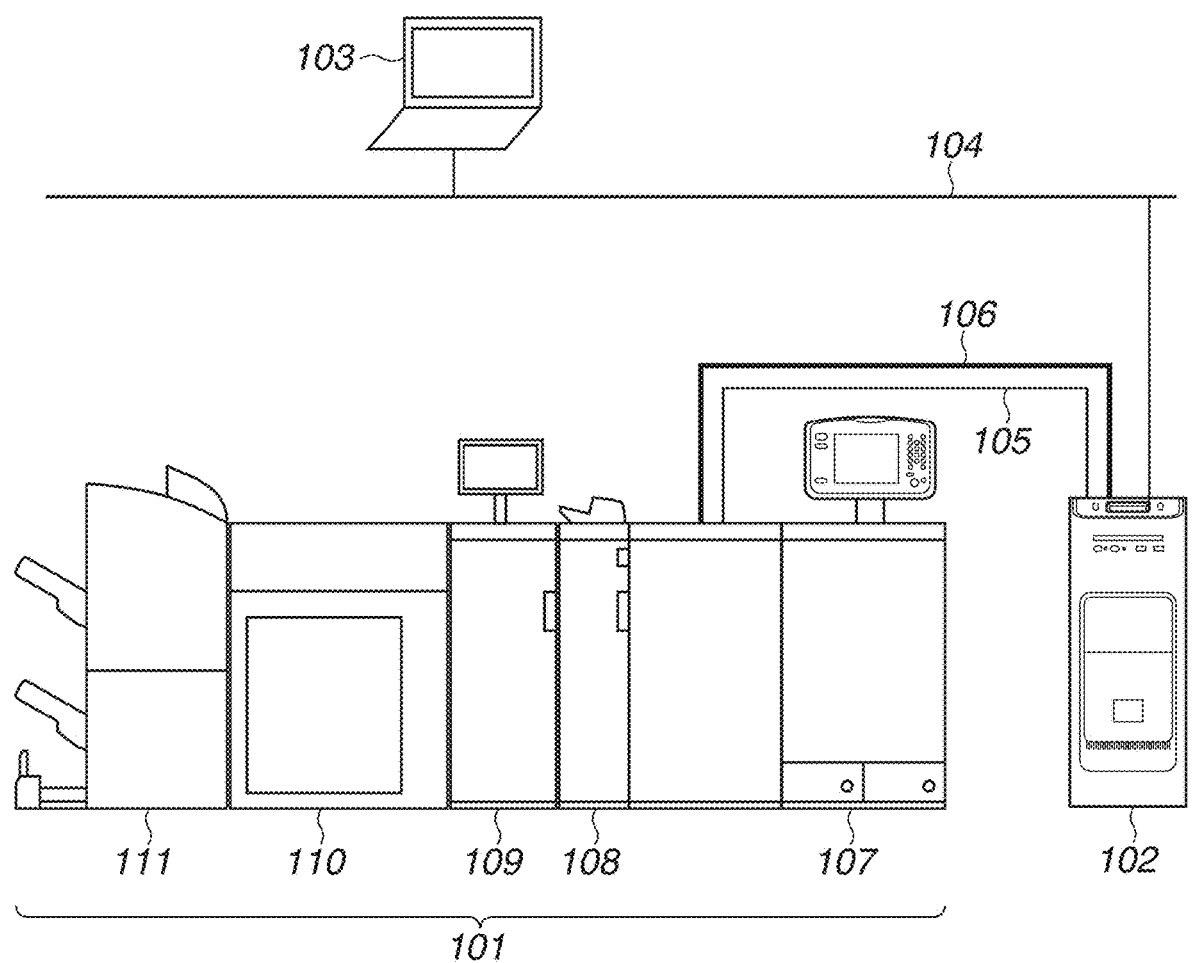
FIG. 1 is a diagram illustrating an example of a system configuration of an image processing system.

A first exemplary embodiment will be described next. FIG. 1 illustrates an example of a system configuration of an image processing system. The image processing system includes an image forming apparatus 101 and an external controller 102. The image forming apparatus 101 and the external controller 102 are communicably connected to each other via an internal local area network (LAN) 105 and a video cable 106. The external controller 102 is communicably connected to a personal computer (PC) 103 via an external LAN 104. The PC 103 issues a print instruction to the external controller 102.

A printer driver installed in the PC 103 has a function of converting print data into a print description language that can be processed by the external controller 102. The user who is to perform printing can issue a print instruction from various applications via the printer driver. The printer driver transmits print data to the external controller 102 based on the print instruction from the user. Upon reception of the print instruction from the PC 103, the external controller 102 performs data analysis and rasterize processing, and supplies the print data to the image forming apparatus 101 to issue a print instruction.

The image forming apparatus 101 will be described next. The image forming apparatus 101 includes a plurality of apparatuses (described below) having different functions that is connected to perform complicated print processing such as bookbinding. A printing apparatus 107 uses toner to form an image on a sheet conveyed from a paper feed unit that is located at the bottom of the printing apparatus 107. The configuration and operating principle of the printing apparatus 107 is as follows. A light beam such as a laser beam modulated based on image data is reflected by a rotating polygon mirror and then irradiated to a photosensitive drum as scanning light. An electrostatic latent image formed on the photosensitive drum by the laser beam is developed using toner to form a toner image. The toner image is then transferred onto a sheet stuck on a transfer drum. This series of image forming processes is sequentially performed for yellow (Y), magenta (M), cyan (C), and black (K) toners to form a full color image on the sheet. The sheet, on the transfer drum, having the full color image formed thereon is conveyed to a fixing unit. The fixing unit includes a roller and a belt. The roller includes a heat source such as a halogen heater. The toner on the sheet with the toner images transferred thereon is melted and fixed to the sheet by heat and pressure.

An inserter 108 is used to insert an insertion sheet. The inserter 108 enables the insertion sheet to be inserted into an arbitrary position of a group of sheets subjected to printing and conveyed by the printing apparatus 107. A verification apparatus 109 scans the printed image of a conveyed sheet and then compares the scanned image with a preregistered correct answer image to determine whether the printed image is appropriate. The sheet is an example of a recording medium. A large-capacity stacker 110 is capable of stacking a large number of sheets. A finisher 111 applies finishing processing to conveyed sheets and then discharges the processed sheets to a discharge tray. Examples of the finishing processing include stapling, punching, and saddle stitching bookbinding.

While, in the printing system described with reference to FIG. 1, the external controller 102 is connected to the image forming apparatus 101, the configuration is not limited thereto. More specifically, the image forming apparatus 101 may be connected to the external LAN 104, and print data that can be processed by the image forming apparatus 101 may be transmitted from the PC 103 to the image forming apparatus 101. In this case, the image forming apparatus 101 performs data analysis, rasterize processing, and then print processing.

Figure 2:
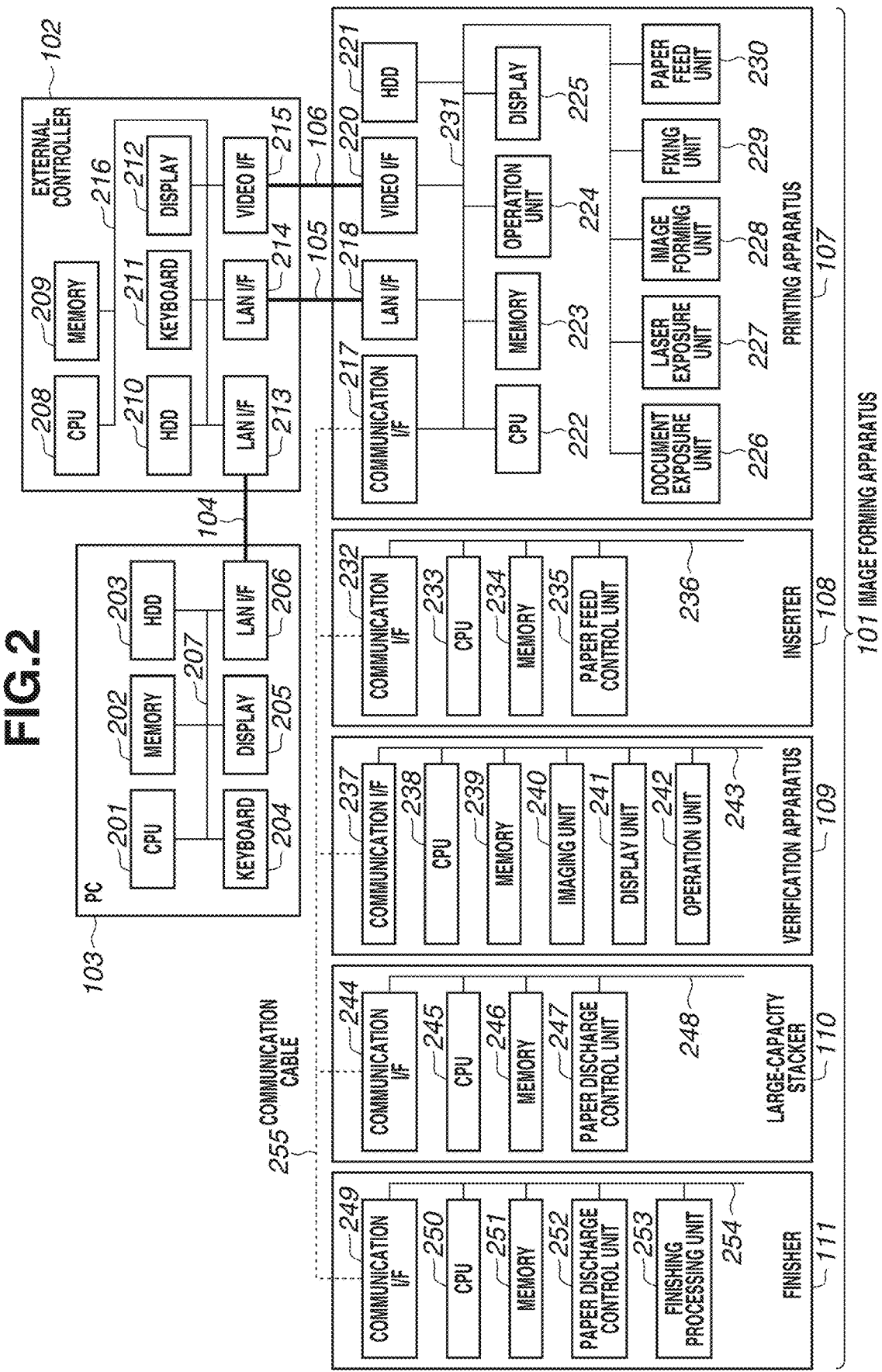
FIG. 2 is a diagram illustrating examples of hardware configurations of an image forming apparatus, an external controller, and a personal computer (PC).

FIG. 2 illustrates examples of hardware configurations of the image forming apparatus 101, the external controller 102, and the PC 103. The configuration of the printing apparatus 107 of the image forming apparatus 101 will be described first. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a paper feed unit 230. These units are connected to each other via a system bus 231.

The communication I/F 217 is connected to the inserter 108, the verification apparatus 109, the large-capacity stacker 110, and the finisher 111 via a communication cable 255 to perform communication for controlling each of the apparatuses. The LAN I/F 218 is connected to the external controller 102 via the internal LAN 105 to communicate data such as print data. The video I/F 220 is connected to the external controller 102 via the video cable 106 to communicate data such as image data.

The HDD 221 is a storage device storing programs and data. The CPU 222 comprehensively performs image processing control and printing control based on the programs stored in the HDD 221. The memory 223 stores programs and image data for the CPU 222 to perform various processes, and operates as a work area. The operation unit 224 receives various setting inputs and operation instructions from the user. The display 225 displays setting information and print job processing status of the image forming apparatus 101.

The document exposure unit 226 performs processing for scanning a document when a copy function or a scan function is used. The document exposure unit 226 scans document data by using a complementary metal oxide semiconductor (CMOS) image sensor to capture an image of a sheet placed by the user while illuminating the sheet using an exposure lamp. The laser exposure unit 227 performs primary charging for irradiating the photosensitive drum with a laser beam and performs laser exposure to transfer toner images. The laser exposure unit 227 first performs primary charging for charging the surface of the photosensitive drum to a uniform negative potential. Then, a laser driver irradiates the photosensitive drum with the laser beam while adjusting the reflection angle using the polygon mirror. Accordingly, negative charges on the irradiated portions are neutralized to form an electrostatic latent image.

The image forming unit 228 includes a developing unit, a transfer unit, and a toner supply unit, and transfers the toner on the photosensitive drum onto a sheet. The developing unit applies the negatively charged toner from a developing cylinder to the electrostatic latent image on the surface of the photosensitive drum to form a visible image. The transfer unit performs a primary transfer that applies a positive potential to a primary transfer roller to transfer the toner on the surface of the photosensitive drum onto a transfer belt, and performs a secondary transfer that applies a positive potential to an external secondary transfer roller to transfer the toner on the transfer belt onto a sheet. The fixing unit 229 includes a heater, a fixing belt, and a pressurization belt, and melts and fixes the toner to the sheet with heat and pressure. The paper feed unit 230 supplies sheets, and controls feeding and conveyance of the sheets using rollers and various types of sensors.

The configuration of the inserter 108 of the image forming apparatus 101 will be described next. The inserter 108 of the image forming apparatus 101 includes a communication I/F 232, a CPU 233, a memory 234, and a paper feed control unit 235 that are connected to each other via a system bus 236. The communication I/F 232 is connected to the printing apparatus 107 via the communication cable 255 to perform communication for control. The CPU 233 performs various control operations for sheet feeding based on a control program stored in the memory 234. The memory 234 is a storage device storing the control program. The paper feed control unit 235 controls the feeding and conveyance of a sheet conveyed from a paper feed unit of the inserter 108 or the printing apparatus 107 while controlling the rollers and sensors based on an instruction from the CPU 233.

The configuration of the verification apparatus 109 of the image forming apparatus 101 will be described next. The verification apparatus 109 of the image forming apparatus 101 includes a communication I/F 237, a CPU 238, a memory 239, an imaging unit 240, a display unit 241, and an operation unit 242 that are connected to each other via a system bus 243. The communication I/F 237 is connected to the printing apparatus 107 via the communication cable 255 to perform communication for control. The CPU 238 performs various control operations for verification based on a control program stored in the memory 239. The memory 239 is a storage device storing the control program. The imaging unit 240 captures an image of a conveyed sheet based on an instruction from the CPU 238. The imaging unit 240 scans not only a print product subject to verification but also a print product for acquiring a candidate correct answer image at the time of registration of a correct answer image. A correct answer image is generated by acquiring a plurality of images for each page of the print product and then superimposing and averaging the images. This can minimize the amount of small variation components that are included in the print product and cannot be detected by verification. The CPU 238 compares a printed image captured by the imaging unit 240 with a correct answer image stored in the memory 239 to determine whether the printed image is appropriate. The display unit 241 displays a verification result, a setting screen, or the like. The operation unit 242 is operated by the user and receives instructions such as an instruction for changing the settings of the verification apparatus 109 and an instruction for registering a correct answer image.

The configuration of the large-capacity stacker 110 of the image forming apparatus 101 will be described next. The large-capacity stacker 110 of the image forming apparatus 101 includes a communication I/F 244, a CPU 245, a memory 246, and a paper discharge control unit 247 that are connected to each other via a system bus 248. The communication I/F 244 is connected to the printing apparatus 107 via the communication cable 255 to perform communication for control. The CPU 245 performs various control operations for sheet discharge based on a control program stored in the memory 246. The memory 246 is a storage device storing the control program. The paper discharge control unit 247 controls the conveyance of a conveyed sheet to a stack tray 341 (see FIG. 3), an escape tray 346 (see FIG. 3), or the finisher 111 as the subsequent apparatus, based on an instruction from the CPU 245.

The configuration of the finisher 111 of the image forming apparatus 101 will be described next. The finisher 111 of the image forming apparatus 101 includes a communication I/F 249, a CPU 250, a memory 251, a paper discharge control unit 252, and a finishing processing unit 253 that are connected to each other via a system bus 254. The communication I/F 249 is connected to the printing apparatus 107 via the communication cable 255 to perform communication for control. The CPU 250 performs various control operations for finishing and sheet discharge based on a control program stored in the memory 251. The memory 251 is a storage device storing the control program. The paper discharge control unit 252 controls the conveyance and discharge of a sheet based on an instruction from the CPU 250. The finishing processing unit 253 controls finishing processing such as stapling, punching, and saddle stitching bookbinding based on an instruction from the CPU 250.

The configuration of the external controller 102 will be described next. The external controller 102 includes a CPU 208, a memory 209, an HDD 210, a keyboard 211, a display 212, LAN I/Fs 213 and 214, and a video I/F 215 that are connected to each other via a system bus 216. The CPU 208 comprehensively performs reception of print data from the PC 103, raster image processing (RIP) on the print data, and transmission of the print data to the image forming apparatus 101 based on programs and data stored in the HDD 210. The memory 209 stores programs and data for the CPU 208 to perform various processes, and operates as a work area. The HDD 210 stores programs and data for operations such as print processing. The keyboard 211 is used to input an instruction for operating the external controller 102. The display 212 displays information regarding, for example, an application executed by the external controller 102 using video signals of still images and moving images. The LAN I/F 213 is connected to the PC 103 via the external LAN 104 to communicate data such as a print instruction. The LAN I/F 214 is connected to the image forming apparatus 101 via the internal LAN 105 to communicate data such as a print instruction. The video I/F 215 is connected to the image forming apparatus 101 via the video cable 106 to communicate data such as print data.

The configuration of the PC 103 will be described next. The PC 103 includes a CPU 201, a memory 202, an HDD 203, a keyboard 204, a display 205, and a LAN I/F 206 that are connected to each other via a system bus 207. The CPU 201 generates print data and issues a print instruction based on a document processing program stored in the HDD 203. The CPU 201 also comprehensively controls each device connected to the system bus 207. The memory 202 stores programs and data for the CPU 201 to perform various processes, and operates as a work area. The HDD 203 stores programs and data for operations such as print processing. The keyboard 204 is used to input an instruction for operating the PC 103. The display 205 displays information regarding, for example, an application executed by the PC 103 using video signals of still images and moving images. The LAN I/F 206 is connected to the external LAN 104 to communicate data such as a print instruction.

While, as described above, the external controller 102 and the image forming apparatus 101 are connected to each other via the internal LAN 105 and the video cable 106, the configuration is not limited thereto. For example, the external controller 102 and the image forming apparatus 101 may be connected to each other only via the video cable 106 as long as data transmission and reception for printing can be performed. In addition, each of the memories 202, 209, 223, 234, 239, 246, and 251 is to store data and programs. For example, the memory may be substituted by a volatile random access memory (RAM), a nonvolatile read only memory (ROM), a built-in HDD, an external HDD, or a universal serial bus (USB) memory.

Figure 3:
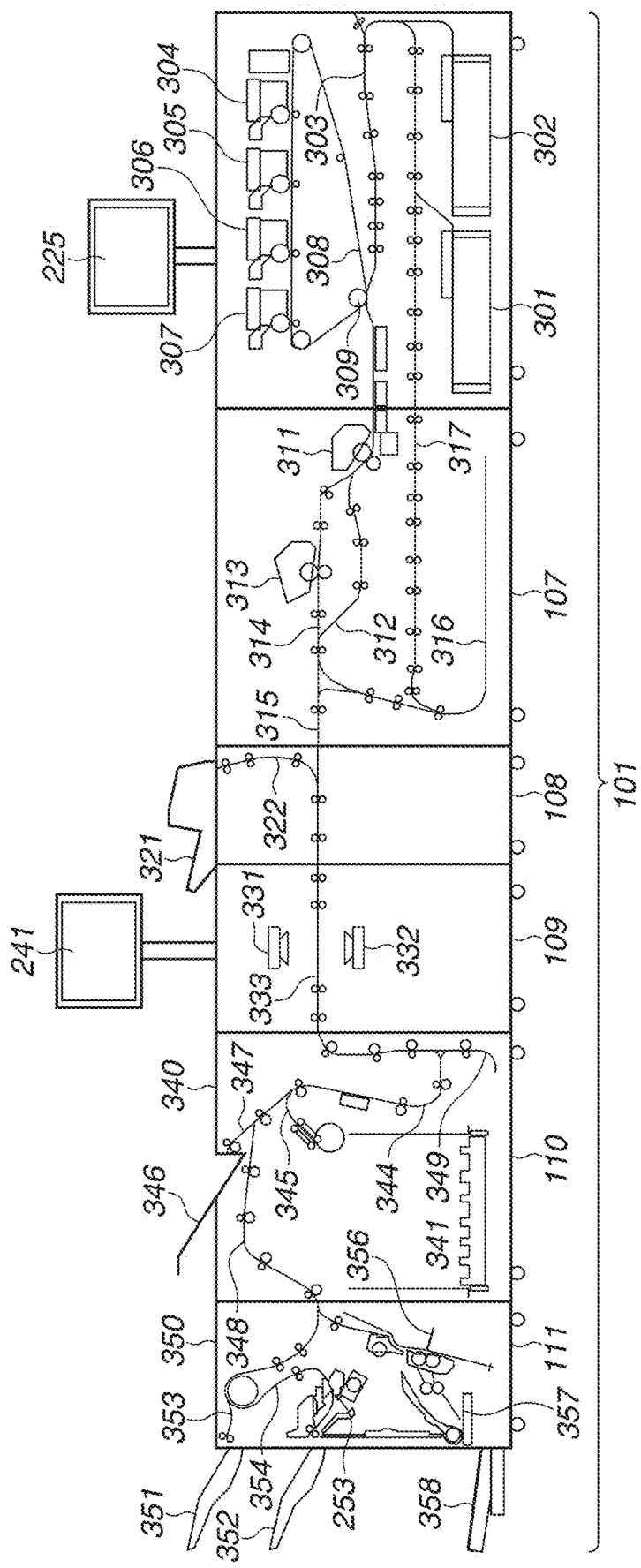
FIG. 3 is a diagram illustrating an example of a mechanical cross-section of the image forming apparatus.

FIG. 3 illustrates an example of a mechanical cross-section of the image forming apparatus 101. The printing apparatus 107 forms an image to be printed on a sheet. Each of paper feed decks 301 and 302 is capable of storing various types of sheets. Each of the paper feed decks 301 and 302 is capable of separating only the uppermost sheet from the stored sheets and then conveying the sheet to a sheet conveyance path 303. Development stations 304, 305, 306, and 307 form toner images by using Y, M, C, and K color toners, respectively, to form a color image. The formed toner images are primarily transferred onto an intermediate transfer belt 308 rotating clockwise (when viewed in FIG. 3). At a secondary transfer position 309, the toner images are transferred onto the sheet conveyed from the sheet conveyance path 303.

The display 225 displays the print status and setting information of the image forming apparatus 101. The fixing unit 311 fixes the toner images to the sheet. The fixing unit 311 includes a pressure roller and a heat roller. When the sheet passes between the rollers, the fixing unit melts and presses the toner to fix the toner images to the sheet. The sheet having exited the fixing unit 311 passes through a sheet conveyance path 312 and then is conveyed to a sheet conveyance path 315. If melting and pressurization are further required to fix the toner images depending on the sheet type, the sheet having passed the fixing unit 311 is conveyed to a second fixing unit 313 via an upper sheet conveyance path. The sheet is subjected to additional melting and pressurization, and then conveyed to the sheet conveyance path 315 via a sheet conveyance path 314. When the image forming mode is a two-sided mode, the sheet is conveyed to a sheet reversing path 316. After being reversed on the sheet reversing path 316, the sheet is conveyed to a two-sided conveyance path 317 and then subjected to image transfer on the back side at the secondary transfer position 309.

The inserter 108 inserts an insertion sheet. The inserter 108 including an inserter tray 321 conveys the insertion sheet fed from the inserter tray 321 to the sheet conveyance path 315 via a sheet conveyance path 322. Accordingly, the inserter 108 can insert the insertion sheet into an arbitrary position of a group of sheets conveyed from the printing apparatus 107, and convey the group of sheets to the subsequent apparatus. The sheet having passed the inserter 108 is conveyed to the verification apparatus 109. The verification apparatus 109 includes contact image sensors (CISs) 331 and 332 disposed to face each other. The CISs 331 and 332 are used to scan the front side and back side of the sheet, respectively. The image sensors for scanning the sheet are not limited thereto but may be line scan cameras. At the timing when the sheet conveyed to a sheet conveyance path 333 reaches a predetermined position, the verification apparatus 109 scans the printed image of the sheet using the CISs 331 and 332 to determine whether the printed image is appropriate. The display unit 241 displays, for example, a result of the verification performed by the verification apparatus 109.

The large-capacity stacker 110 includes the stack tray 341 for stacking sheets and is capable of stacking a large number of sheets. The sheet having passed the verification apparatus 109 is input to the large-capacity stacker 110 via a sheet conveyance path 344. The sheet is conveyed along a sheet conveyance path 345 from the sheet conveyance path 344 and then stacked on the stack tray 341. Furthermore, a stacker 340 includes the escape tray 346 as a paper discharge tray. The escape tray 346 is a paper discharge tray used to discharge a sheet determined to be defective by the verification apparatus 109. In the case of outputting a sheet to the escape tray 346, the sheet is conveyed to the escape tray 346 via a sheet conveyance path 347 from the sheet conveyance path 344. In the case of conveying a sheet to the finisher 111 as the post-processing apparatus following the large-capacity stacker 110, the sheet is conveyed via a sheet conveyance path 348. A reversing unit 349 for reversing a sheet is used to stack the sheet on the stack tray 341. When a sheet is stacked on the stack tray 341, the sheet is once reversed by the reversing unit 349 so that the orientation of the output sheet matches the orientation of the input sheet. When a sheet is conveyed to the escape tray 346 or the finisher 111 as the subsequent post-processing apparatus, the sheet is discharged directly without being flipped, and thus the reversing unit 349 does not perform the reversing operation.

The finisher 111 performs finishing processing, which corresponds to the function specified by the user, on conveyed sheets. More specifically, the finisher 111 has finishing functions including stapling (one or two position stapling), punching (two or three hole punching), and saddle stitching bookbinding. The finisher 111 includes paper discharge trays 351 and 352. A sheet is output to the paper discharge tray 351 via a sheet conveyance path 353. However, finishing processing such as stapling cannot be performed in the sheet conveyance path 353. When finishing processing such as stapling is performed, the finishing processing unit 253 subjects the sheet conveyed via the sheet conveyance path 354 to the finishing function specified by the user, and then the sheet is output to the paper discharge tray 352. Each of the paper discharge trays 351 and 352 can be moved up and down. For example, the paper discharge tray 351 is lowered, so that sheets having been subjected to finishing processing by the finishing processing unit 253 can be stacked on the paper discharge tray 351. When saddle stitching bookbinding is specified by the user, a saddle stitching processing unit 356 applies stapling processing to the center of the sheet, folds the sheet in two, and outputs the sheet to a saddle stitching bookbinding tray 358 via a sheet conveyance path 357. The saddle stitching bookbinding tray 358 has a belt conveyor configuration in which a sheet bundle subjected to saddle stitching bookbinding and stacked on the saddle stitching bookbinding tray 358 is conveyed to the left side.

The verification apparatus 109 verifies a printed image of a conveyed sheet based on preset verification items. More specifically, the verification apparatus 109 verifies the printed image of the conveyed sheet by comparing the printed image with a preregistered correct answer image. The image comparison method is, for example, comparing the pixel values at the corresponding positions of the images, comparing the object positions using edge detection, or extracting character data using Optical Character Recognition (OCR). The verification items include print position deviations, image tones, image density, streaks, blurs, and missing prints.

Figure 4A:
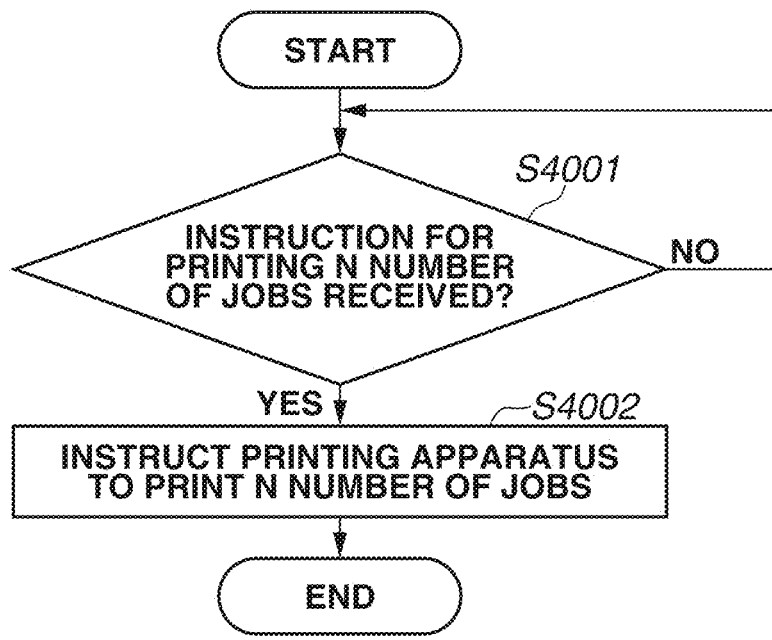
FIGS. 4A and 4B are flowcharts each illustrating information processing performed when a correct answer image is registered.

Processing for registering a correct answer image and information processing for image verification will be described next with reference to FIGS. 4A to 7. FIG. 4A is a flowchart illustrating information processing performed by the external controller 102 when a correct answer image is registered. The processing illustrated in FIG. 4A is performed by the CPU 208 of the external controller 102. In step S4001, the CPU 208 determines whether an instruction to print N number of print jobs is received. When the instruction to print N number of print jobs is received (YES in step S4001), the processing proceeds to step S4002. In step S4002, the CPU 208 inputs the print data for N number of print jobs to the printing apparatus 107 and instructs the printing apparatus 107 to perform printing.

Figure 4B:
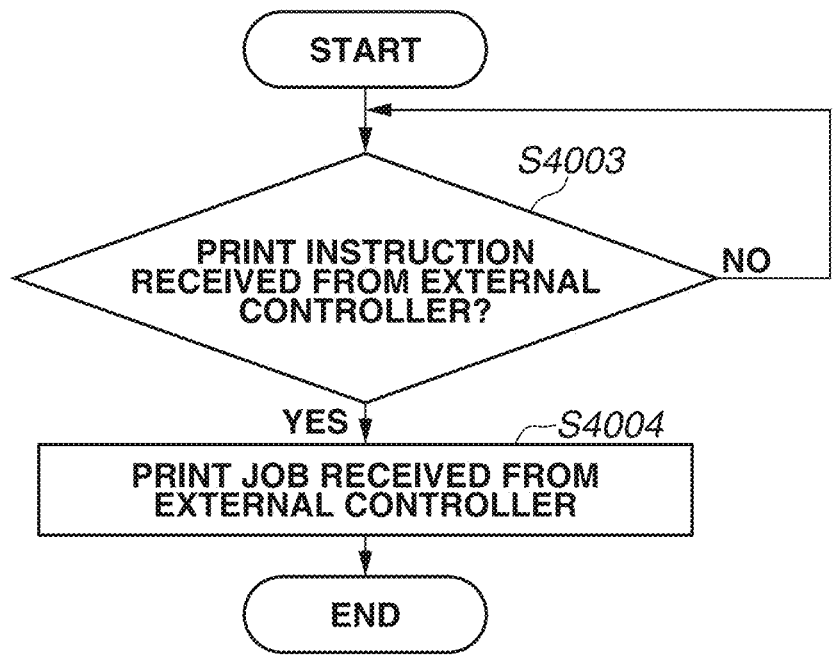

FIG. 4B is a flowchart illustrating information processing performed by the printing apparatus 107 when a correct answer image is registered. The processing illustrated in FIG. 4B is performed by the CPU 222 of the printing apparatus 107. In step S4003, the CPU 222 waits for the reception of a print instruction from the external controller 102. When a print instruction is received from the external controller 102 (YES in step S4003), the processing proceeds to step S4004. In step S4004, the CPU 222 prints a job received from the external controller 102. The job received from the external controller 102 includes not only image data but also information about a paper feed destination and a paper discharge destination. The CPU 222 controls the inserter 108, the verification apparatus 109, the large-capacity stacker 110, and the finisher 111 via the communication cable 255 based on the contents of the job received from the external controller 102.

At this time, when a defective image (described below) is detected in the verification processing by the verification apparatus 109 (in step S505 in FIG. 5) and a re-print instruction is received from the verification apparatus 109, the printing apparatus 107 repeatedly prints the same page.

FIG. 5 is a flowchart illustrating information processing performed by the verification apparatus 109 when a correct answer image is registered. The processing illustrated in FIG. 5 is performed by the CPU 238 of the verification apparatus 109. In step S501, the CPU 238 acquires print settings. The settings acquired in step S501 include the number of pages per job, the side to be verified, and the number of images to be superimposed and averaged to generate a correct answer image for each page. In the present exemplary embodiment, for each page to be verified, five images are superimposed and averaged to generate a correct answer image.

In step S502, the CPU 238 waits until a sheet is conveyed to the verification apparatus 109. When a sheet is conveyed to the verification apparatus 109 (YES in step S502), the processing proceeds to step S503. In step S503, the CPU 238 causes the CISs 331 and 332 to scan the image of the sheet and stores the image in the memory 239 of the verification apparatus 109.

Figure 6A:
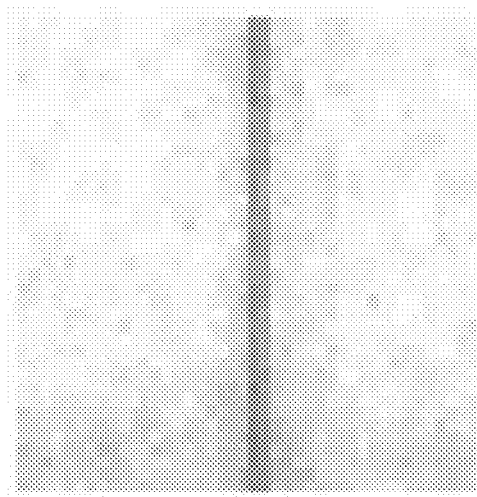
FIG. 6A is a diagram illustrating an example of an image having a streak caused by dust.
Figure 6B:
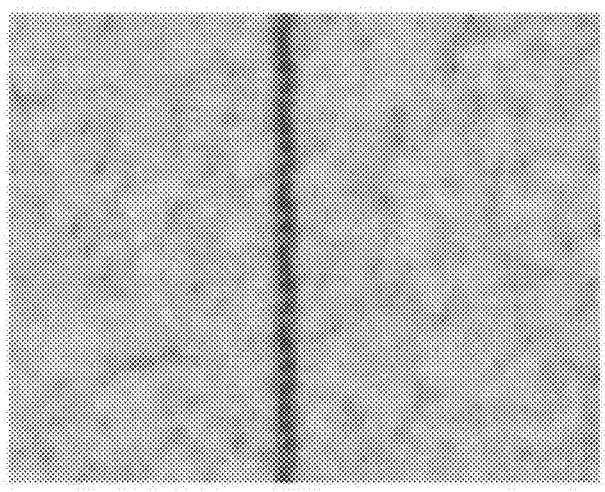
FIG. 6B is a diagram illustrating an example of an image having a vertical line.

In step S504, the CPU 238 subjects the scanned images stored in the memory 239 to defective image detection processing to generate defect information. Examples of defects subject to the defective image detection include streaks caused by dust such as paper dust and fixed streaks. FIG. 6A illustrates an example of an image having a streak caused by dust. FIG. 6B illustrates a vertical line on a document. As an example of an algorithm for detecting a streak caused by dust, the CPU 238 subjects the scanned image to processing for detecting a vertical line with a possible streak width. This processing can be performed using filtering processing. Then, for the detected vertical line, the CPU 238 calculates a variation in the luminance value with respect to the surrounding pixels in the main scanning direction and a variation in the luminance value with respect to the surrounding pixels in the sub scanning direction. The CPU 238 determines whether the detected vertical line has pixels of a streak, based on the calculation result and the continuity in the sub scanning direction.

In step S505, the CPU 238 acquires defect information regarding the scanned image and determines whether the scanned image is defective. When the scanned image is defective (YES in step S505), the processing proceeds to step S506. In step S506, the CPU 238 instructs the printing apparatus 107 to re-print the same page. When the scanned image is not defective (NO in step S505), the processing proceeds to step S507. In step S507, the CPU 238 determines whether the scanning operation is completed for the set number of images acquired in step S501. When the scanning operation is not completed for the set number of images (NO in step S507), the processing returns to step S502. When the scanning operation is completed for the set number of images (YES in step S507), the processing proceeds to step S511. At the time of proceeding to step S511, five candidate correct answer images have been acquired and stored in the memory 239 for each page to be verified. In step S511, the CPU 238 detects an image having a large difference as an exclusion candidate image from the five candidate correct answer images. The processing in step S511 is an example of processing for detecting a candidate correct answer image to be excluded from a plurality of candidate correct answer images.

A relationship between the defect detection processing performed in step S504 and the exclusion candidate image detection processing performed in step S511 will be described next. In step S504, the CPU 238 searches for a typical defect pattern for each page image. Thus, a large number of calculation resources are not required, but a defect such as density unevenness cannot be detected. On the other hand, in step S511, the CPU 238 detects an image having a large difference as an exclusion candidate image from among a plurality of candidate correct answer images, thereby making it possible to detect a defect such as density unevenness that cannot be detected in step S504. More specifically, a group of candidate correct answer images can be acquired with higher accuracy by performing the processing in step S511 to exclude a defective image from the candidate correct answer images.

In step S512, the CPU 238 generates a user interface (UI) screen for inquiring of the user whether to exclude the exclusion candidate image detected in step S511, and displays the UI screen on the display unit 241. Alternatively, the exclusion candidate image may be excluded without inquiring of the user. The UI screen displayed at this time will be described in detail below with reference to FIG. 11. Upon reception of an instruction from the user to generate a correct answer image, the processing proceeds to step S513. In step S513, the CPU 238 generates a correct answer image by superimposing and averaging the candidate correct answer images. Then, the processing ends. The processing in step S511 will be described in detail below with reference to FIG. 17.

Figure 7:
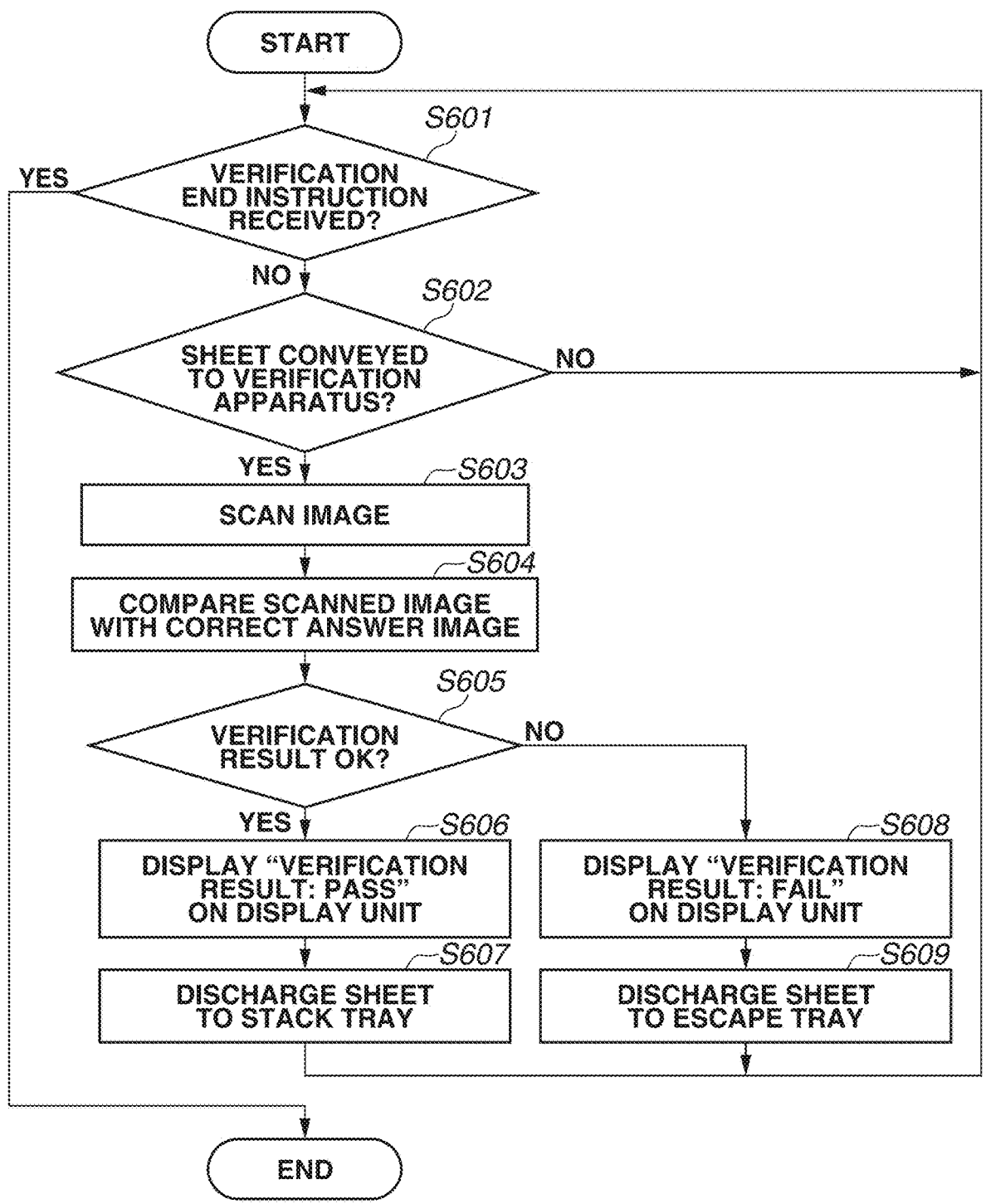
FIG. 7 is a flowchart illustrating information processing performed by the verification apparatus during verification processing.

FIG. 7 is a flowchart illustrating information processing performed by the verification apparatus 109 during the verification processing. The processing illustrated in FIG. 7 is performed by the CPU 238 of the verification apparatus 109. In step S601, the CPU 238 determines whether a verification end instruction is received. When the verification end instruction is received (YES in step S601), the CPU 238 ends the information processing illustrated in FIG. 7. When the verification end instruction is not received (NO in step S601), the processing proceeds to step S602. In step S602, the CPU 238 determines whether the sheet has been conveyed to the verification apparatus 109. When the sheet has not been conveyed to the verification apparatus 109 (NO in step S602), the processing returns to step S601. When the sheet has been conveyed to the verification apparatus 109 (YES in step S602), the processing proceeds to step S603. In step S603, the CPU 238 causes the CISs 331 and 332 to scan the image of the sheet, and stores the image in the memory 239 of the verification apparatus 109.

In step S604, the CPU 238 compares the image scanned in step S603 with a correct answer image. The items used for the comparison in step S604 are based on a verification level set using a setting section 1201 illustrated in FIG. 13, and a verification type set using a setting section 1202 illustrated in FIG. 13. Then in step S605, the CPU 238 determines whether the scanned image is appropriate based on the result of the comparison between the scanned image and the correct answer image in step S604.

Figure 14:
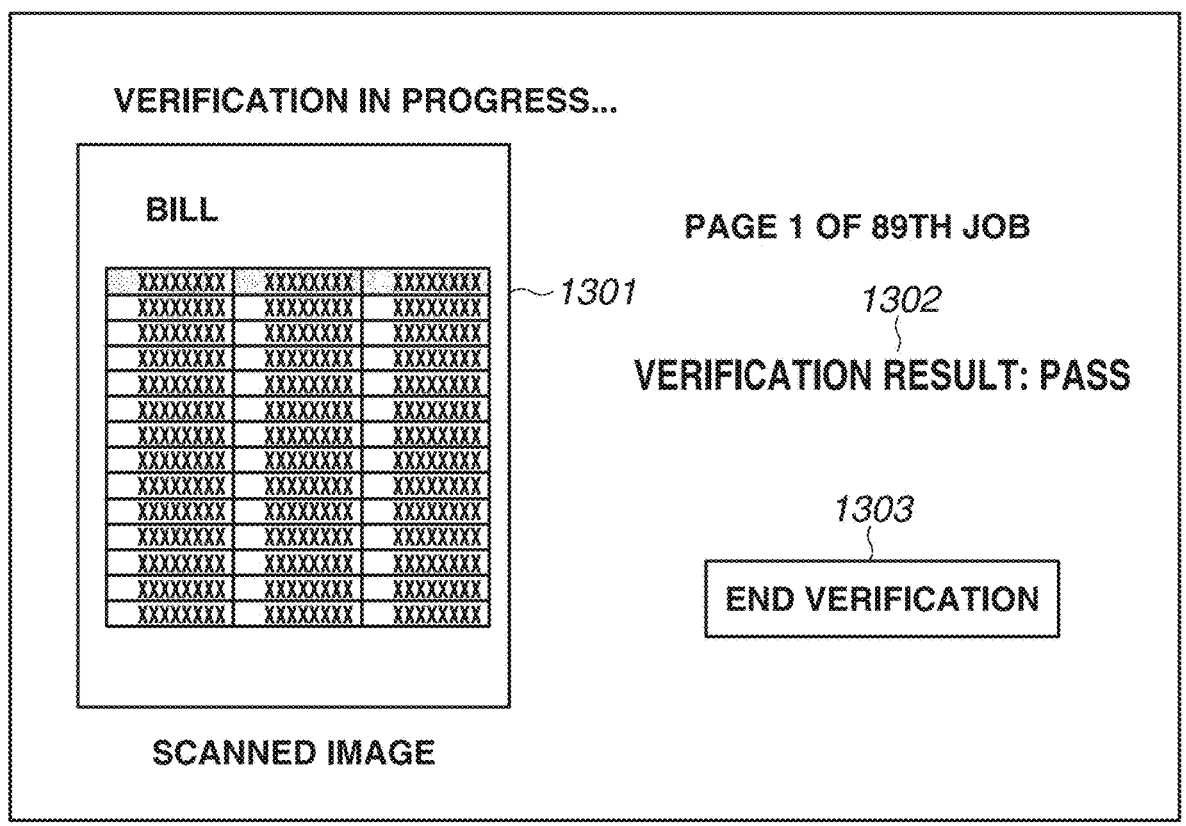
FIG. 14 is a diagram illustrating an example of a screen displayed on the display unit of the verification apparatus after start of verification.

When the scanned image is determined to be appropriate (the verification result is OK) (YES in step S605), the processing proceeds to step S606. In step S606, the CPU 238 displays "VERIFICATION RESULT: PASS" on the display unit 241 of the verification apparatus 109. FIG. 14 illustrates an example of a screen displayed in step S606. In step S607, the CPU 238 instructs the printing apparatus 107 to discharge the sheet to the stack tray 341 of the large-capacity stacker 110. The sheet discharge destination is based on a sheet discharge destination set in a setting section 1503 illustrated in FIG. 16. Based on the instruction from the verification apparatus 109, the printing apparatus 107 instructs the large-capacity stacker 110 to discharge the sheet to the stack tray 341. Then, the processing returns to step S601. In step S601, the CPU 238 continues the processing.

Figure 15:
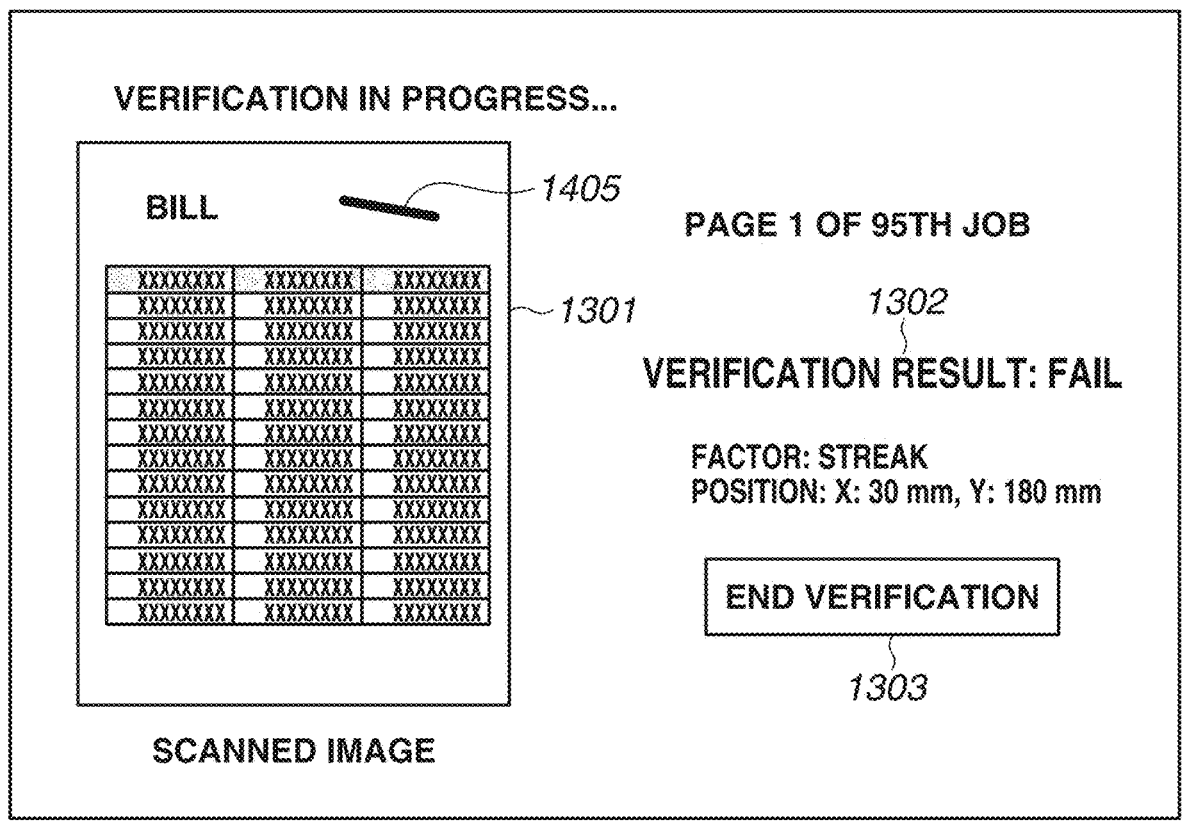
FIG. 15 is a diagram illustrating an example of a screen displayed when a last scanned image is determined to be defective.

When the scanned image is determined to be defective (the verification result is not OK) (NO in step S605), the processing proceeds to step S608. In step S608, the CPU 238 displays "VERIFICATION RESULT: FAIL" on the display unit 241 of the verification apparatus 109. FIG. 15 illustrates an example of a screen displayed in step S608. In step S609, the CPU 238 instructs the printing apparatus 107 to discharge the sheet to the escape tray 346 of the large-capacity stacker 110. The sheet discharge destination is based on a sheet discharge destination set for rejected sheets in the setting section 1503 illustrated in FIG. 16. The printing apparatus 107 instructs the large-capacity stacker 110 to discharge the sheet to the escape tray 346 based on the instruction from the verification apparatus 109. Then, the processing returns to step S601. In step S601, the CPU 238 continues the processing.

Figure 8:
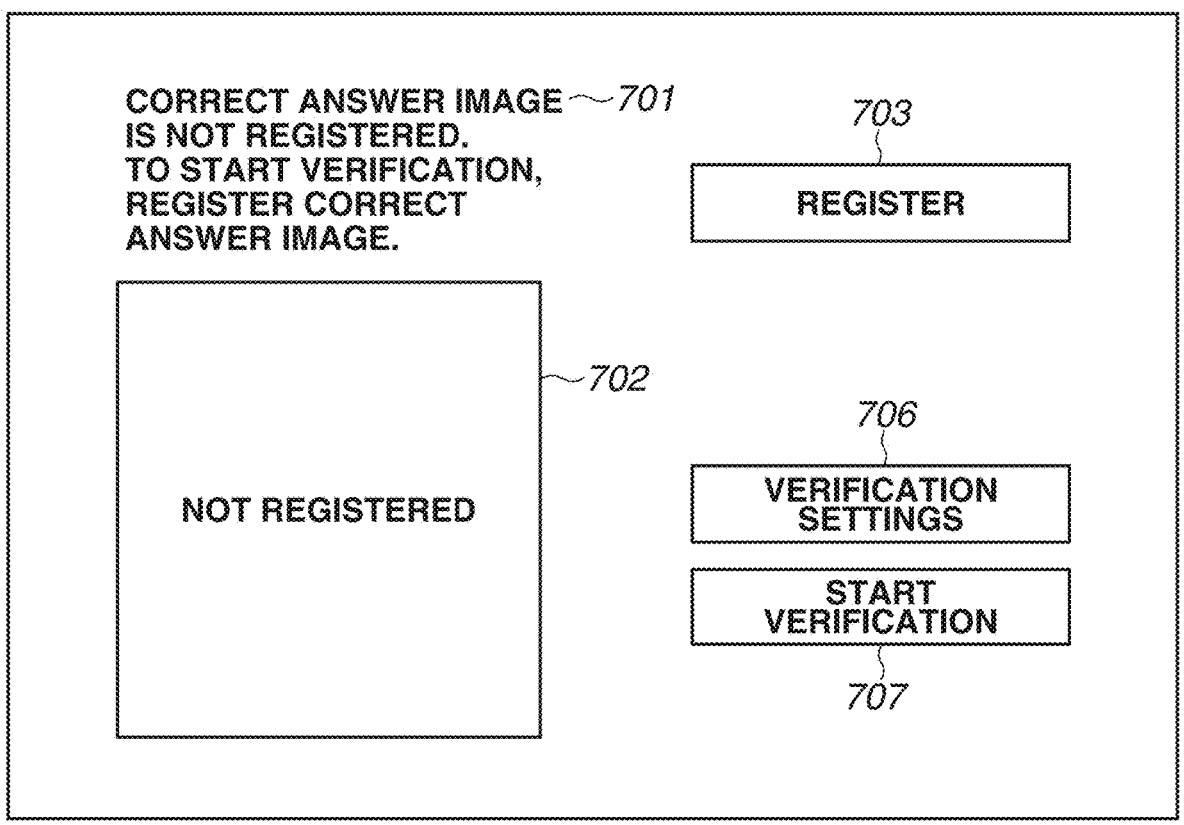
FIG. 8 is a diagram illustrating an example of a screen displayed on a display unit of the verification apparatus during activation of the verification apparatus.

FIGS. 8 to 15 illustrate examples of screens displayed by the verification apparatus 109 based on an instruction of the CPU 238 of the verification apparatus 109. FIG. 8 illustrates an example of a screen displayed on the display unit 241 of the verification apparatus 109 during activation of the verification apparatus 109. A display section 701 displays a message indicating that no correct answer image is registered and a correct answer image is to be registered to start verification. When a correct answer image has been registered, the display section 701 displays a message indicating that verification can be started. A display section 702 displays the registered correct answer image. In FIG. 8, the display section 702 displays a message indicating that no correct answer image is registered since no correct answer image is registered.

A Register button 703 is used to call a screen for registering a correct answer image. A Verification Settings button 706 is used to call a verification settings screen. In the verification settings screen, the user sets verification items and verification accuracy (which is the degree of difference between the scanned image and the correct answer image, over which the scanned image is determined to be defective), based on the user's intention. A Start Verification button 707 is used to issue a verification start instruction. When the Start Verification button 707 is selected, the verification apparatus 109 starts verification of the image of the conveyed sheet.

FIG. 9 illustrates an example of a screen displayed on the display unit 241 of the verification apparatus 109 when a correct answer image is registered. The screen illustrated in FIG. 9 is displayed when the Register button 703 illustrated in FIG. 8 is selected. A setting section 801 is used to set the number of pages for each print job to be verified. In the case of two or more pages per print job, a plurality of images can be registered as correct answer images in the verification apparatus 109.

A setting section 802 is used to set the side to be verified. The setting section 802 enables the user to set whether the verification apparatus 109 verifies both sides of the sheet, only the front side, or only the back side. Even in the case of one-sided printing, both sides may be set to be verified to make sure that there is no dust on the non-print side. A setting section 803 enables the user to set the number of images to be acquired and then superimposed and averaged to generate a correct answer image. A Start Registration button 804 is used to issue an instruction to register a correct answer image. After the Start Registration button 804 is selected, the verification apparatus 109 scans the printed image of the conveyed sheet to register a correct answer image.

Figure 10:
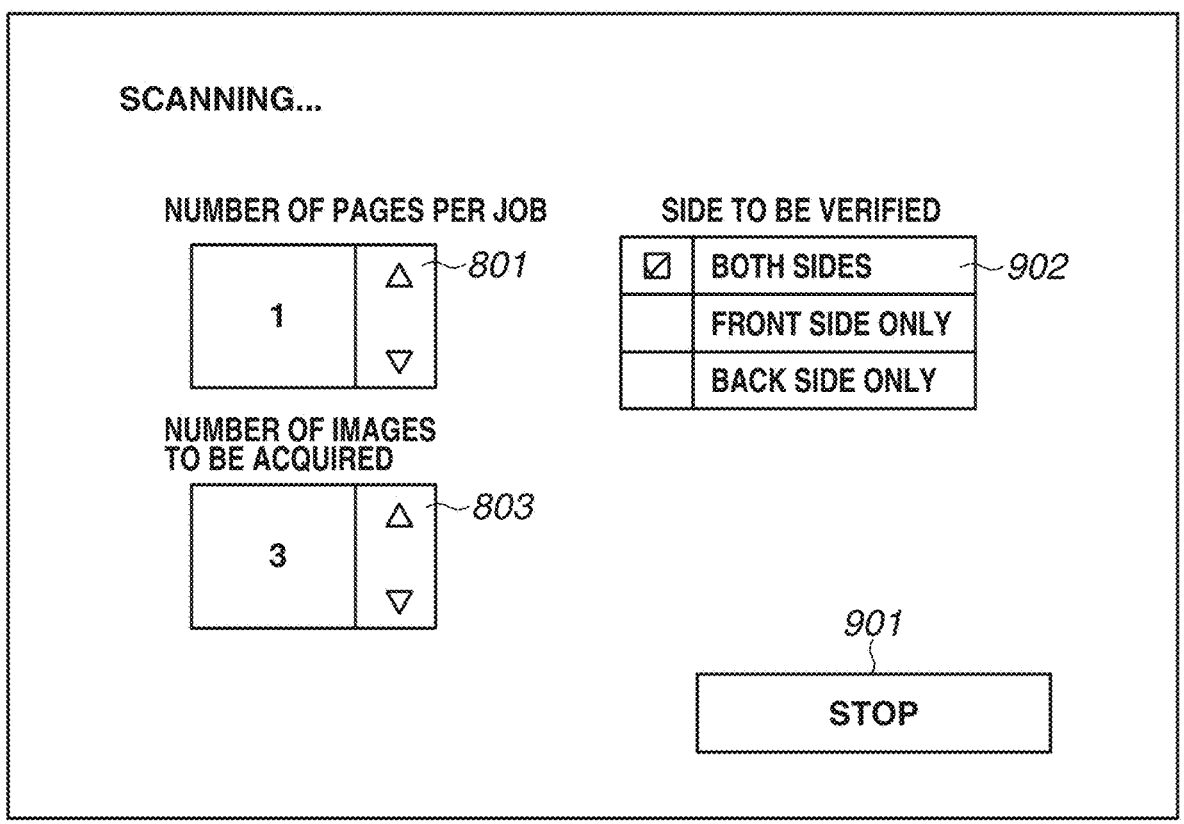
FIG. 10 is a diagram illustrating an example of a screen displayed on the display unit of the verification apparatus during scanning of images for generating a correct answer image.

FIG. 10 illustrates an example of a screen displayed on the display unit 241 of the verification apparatus 109 during scanning of images for generating a correct answer image. The screen illustrated in FIG. 10 is displayed when the Start Registration button 804 illustrated in FIG. 9 is selected. This screen remains displayed until the image scanning operation is completed for the numbers set in the setting sections 801 and 803. A Stop button 901 is used to issue an instruction to stop the scanning. When the Stop button 901 is selected, correct answer image registration is not performed and the screen returns to the screen illustrated in FIG. 8.

Figure 11:
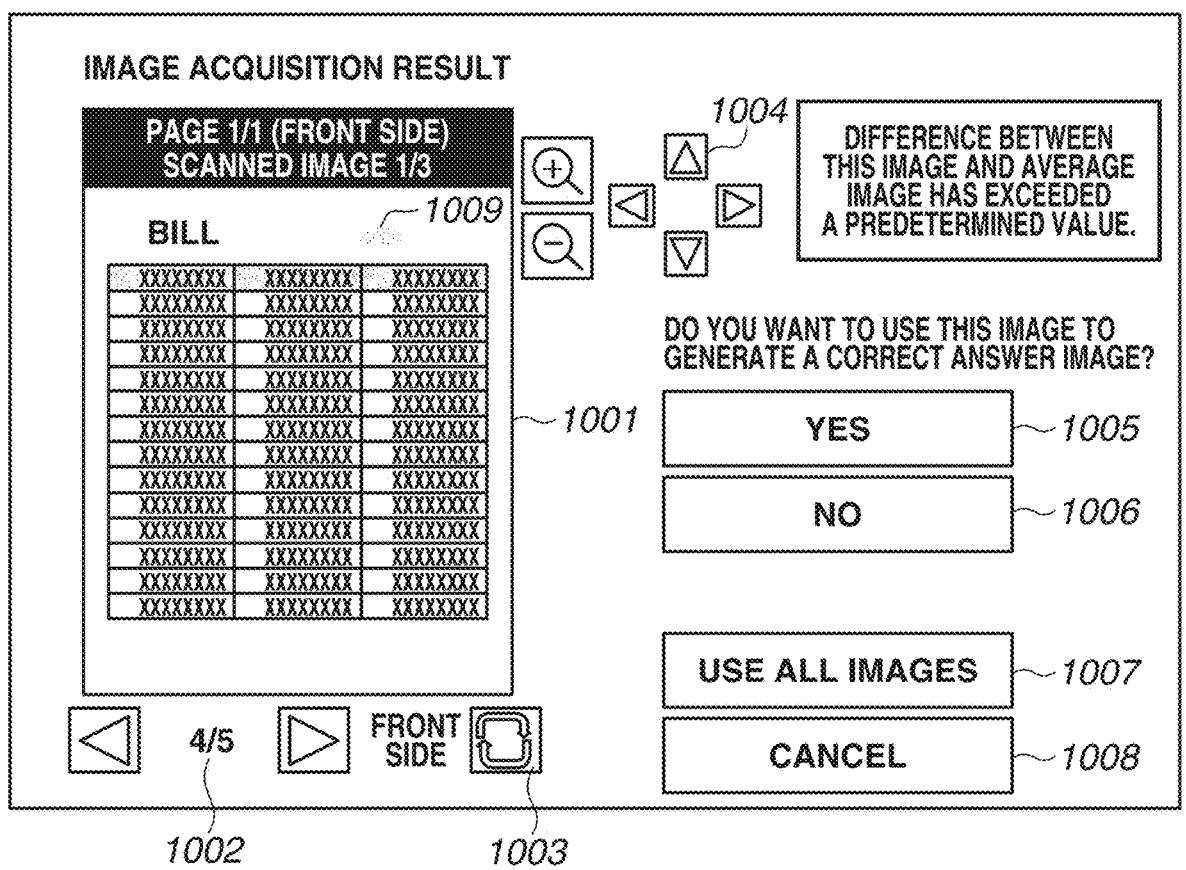
FIG. 11 is a diagram illustrating an example of a screen displayed on the display unit of the verification apparatus after completion of the scanning of the images for generating a correct answer image.

FIG. 11 illustrates an example of a screen displayed on the display unit 241 of the verification apparatus 109 after completion of the image scanning operation. A display section 1001 displays a preview of the printed image of the sheet scanned by the verification apparatus 109. In FIG. 11, the display section 1001 displays the exclusion candidate image detected as the image having a large difference in step S511. The display of the exclusion candidate image may be prioritized in this way. The image displayed in the display section 1001 can be changed by using a change button 1002. When both the front and back sides are verified, a switch button 1003 can be used to switch between the front side and the back side. To check whether the scanned image includes any other defect, image enlargement/reduction buttons 1004 are used to check the entire image and details. The buttons 1002, 1003, and 1004 are an example. Instead of displaying these operation buttons, gesture operations such as flicking, pinching, and swiping may be assigned to perform the respective operations.

A Yes button 1005 is used to, after confirming the scanned image currently displayed in the display section 1001, issue an instruction to use the image as a candidate correct answer image. Among the acquired images, those selected with the Yes button 1005 are superimposed and averaged to generate a correct answer image. A No button 1006 is used to issue an instruction to exclude the currently displayed image from the candidate correct answer images. Among the acquired images, an image selected with the No button 1006 is discarded and not used for generating a correct answer image.

A Use All Images button 1007 is used to issue an instruction to collectively use all the acquired images for generating a correct answer image. A Cancel button 1008 is used to issue an instruction to discard all the acquired images and not use any of the images for generating a correct answer image. When either the Use All Images button 1007 or the Cancel button 1008 is selected, or when either the Yes button 1005 or the No button 1006 is selected for each of the acquired images, the screen illustrated in FIG. 12A is displayed.

Figure 12A:
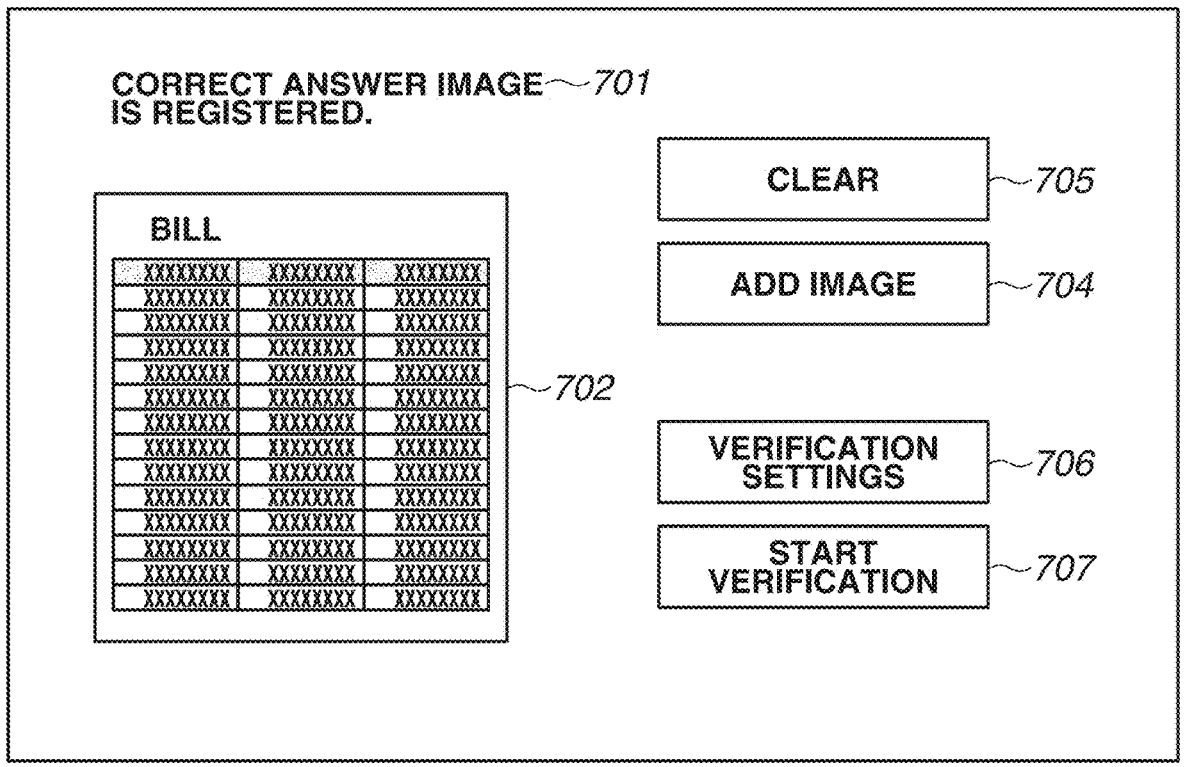
FIGS. 12A and 12B are diagrams each illustrating an example of a screen displayed after acquisition of the images for generating a correct answer image.

FIG. 12A illustrates an example of a screen displayed after acquisition of images for generating a correct answer image. The display section 701 displays a message indicating that a correct answer image is registered, unlike the screen displayed before the acquisition in FIG. 8. The display section 702 displays a registered correct answer image. The correct answer image displayed in the display section 702 is generated by superimposing and averaging a plurality of images of sheets scanned by the CISs 331 and 332. A Clear button 705 is used to clear the registered correct answer image. When the correct answer image is cleared, the screen returns to the screen illustrated in FIG. 8. An Add Image button 704 is used to acquire an additional candidate correct answer image. Referring to FIG. 11, if the user cancels some of the acquired images and wishes to acquire an additional candidate correct answer image, the user can select the Add Image button 704 to acquire an additional candidate correct answer image. When the Add Image button 704 is selected, the screen illustrated in FIG. 12B is displayed.

Figure 12B:
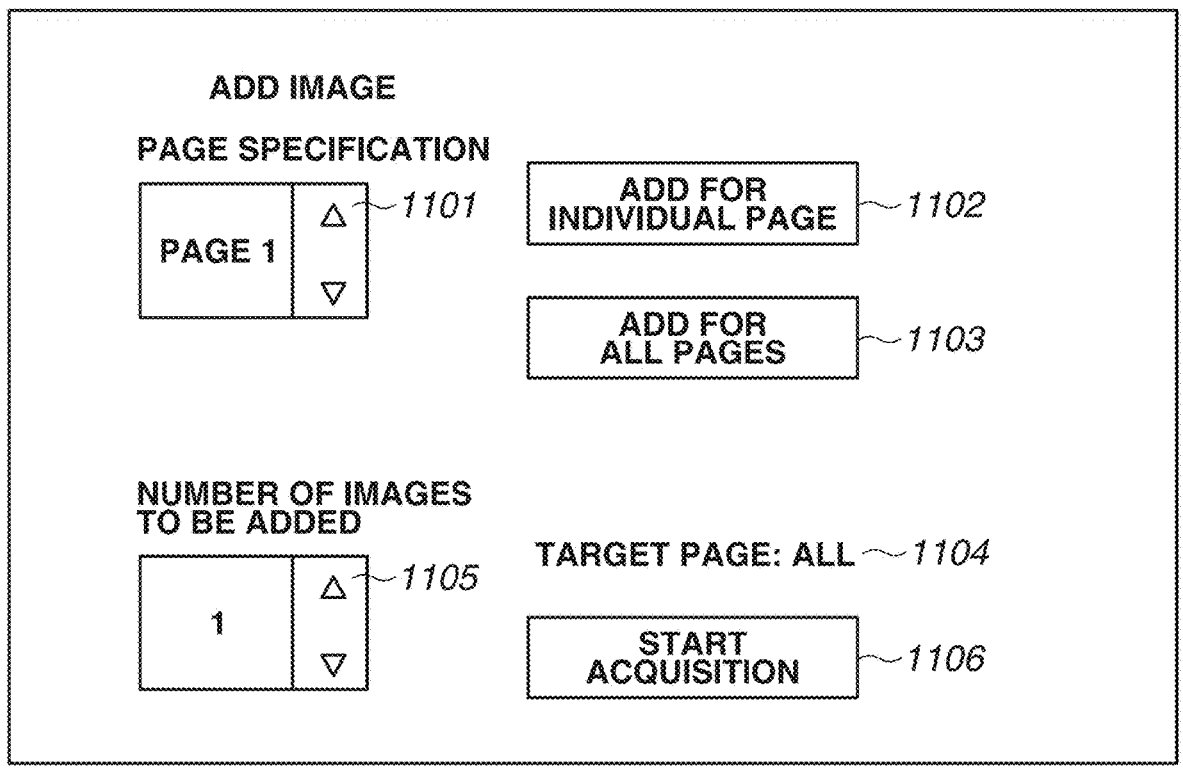

FIG. 12B illustrates an example of a screen for setting the acquisition of an additional candidate correct answer image. A Page Specification button 1101 is used to specify a page for which a candidate correct answer image is to be additionally acquired. An Add for Individual Page button 1102 is used to issue an instruction to acquire an additional candidate correct answer image for the page specified using the Page Specification button 1101. An Add for All Pages button 1103 is used to issue an instruction to collectively acquire additional candidate correct answer images for all pages.

A display section 1104 displays the page(s) specified using the Add for Individual Page button 1102 or the Add for All Pages button 1103. A Number of Images to be Added button 1105 is used to specify the number of candidate correct answer images to be added for each specified page. A Start Acquisition button 1106 is used to start the acquisition. When the Start Acquisition button 1106 is selected and then the specified number of candidate correct answer images are acquired, the screen illustrated in FIG. 11 is displayed.

Figure 13:
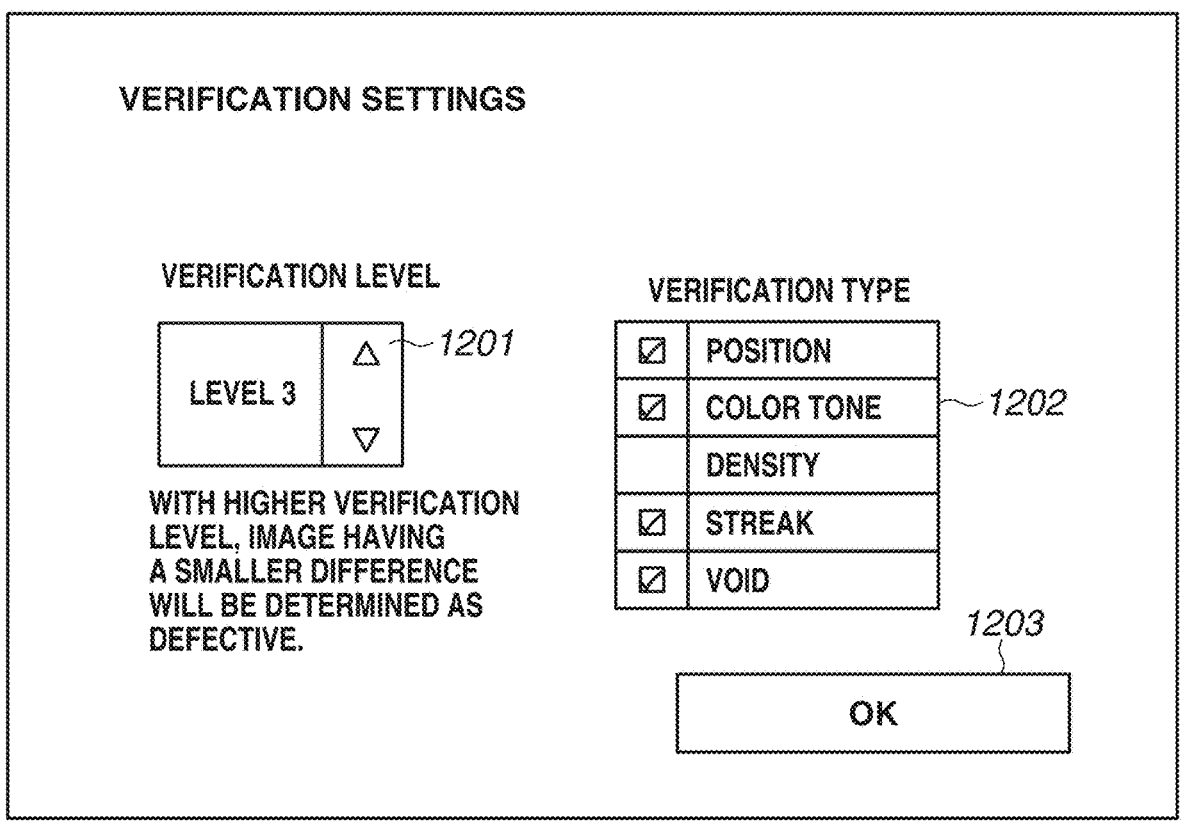
FIG. 13 is a diagram illustrating an example of a screen displayed on the display unit of the verification apparatus during verification setting.

FIG. 13 illustrates an example of a screen displayed on the display unit 241 of the verification apparatus 109 when verification settings are performed. The screen illustrated in FIG. 13 is displayed when the Verification Settings button 706 illustrated in FIG. 8 is selected. A setting section 1201 is used to set the level of verification. The user can change the verification accuracy by using the setting section 1201. With higher verification accuracy, the verification apparatus 109 determines the scanned image having a smaller difference from the correct answer image as defective. A setting section 1202 is used to set the type of verification. The setting section 1202 enables the user to set verification items based on the user's intention. The example illustrated in FIG. 13 indicates that the sheet is verified for print positions, image tones, streaks, and voids, but is not verified for density. The verification types according to the present exemplary embodiment are an example.

FIG. 14 illustrates an example of a screen displayed on the display unit 241 of the verification apparatus 109 after the start of verification. The screen illustrated in FIG. 14 is displayed when the Start Verification button 707 illustrated in FIG. 8 is selected. A display section 1301 displays the printed image of the last sheet scanned by the verification apparatus 109. A display section 1302 displays an evaluation result based on the comparison between the scanned image displayed in the display section 1301 and the correct answer image. In the example illustrated in FIG. 14, the display section 1302 displays "VERIFICATION RESULT: PASS" because the scanned image is determined to be appropriate. An End Verification button 1303 is used to issue a verification end instruction. When the End Verification button 1303 is selected, the verification apparatus 109 ends the verification processing, and the screen returns to the screen illustrated in FIG. 8.

FIG. 15 illustrates an example of a screen displayed when the last scanned image is determined to be defective. The scanned image displayed in the display section 1301 is determined to be defective as a result of the comparison between the scanned image and the correct answer image. The display section 1302 displays "VERIFICATION RESULT: FAIL", the determining factor, and the defect position. The example illustrated in FIG. 15 indicates that the image is determined to be defective because a streak 1405 is detected.

FIG. 16 illustrates an example of a verification job settings screen displayed on the display 212 of the external controller 102. While FIGS. 8 to 15 illustrate examples of screens displayed when verification settings are performed on the verification apparatus 109, an instruction to supply, to the verification apparatus 109, the print sheet for generating a correct answer image or the print sheet subject to verification is issued from the external controller 102. A setting section 1501 is used to set the number of jobs. In the example illustrated in FIG. 16, a setting for printing 1,000 jobs is made.

The setting section 1503 is used to set the sheet discharge destination of the verification jobs. In the setting section 1503, the stack tray 341 is set as the discharge destination, and the escape tray 346 is set as the discharge destination for sheets rejected in the verification. Alternatively, for example, the same tray may be set both for accepted and rejected sheets. In this case, a rejected sheet is to be manually removed later based on a verification result list (not illustrated). Alternatively, when accepted and rejected sheets are discharged to the same tray, the sheets may be discharged so that the positions of the sheets are shifted from each other on the tray to make it easier to perform the removal later.

A Number of Jobs for Correct Answer Image Registration button 1504 and a Print for Correct Answer Image Registration button 1505 is used to issue an instruction to print only N number of verification jobs. When the user issues an instruction to start correct answer image registration to the verification apparatus 109 by using the Start Registration button 804 illustrated in FIG. 9, and then issues an instruction to print N number of verification jobs to the external controller 102 by using the Number of Jobs for Correct Answer Image Registration button 1504 and the Print for Correct Answer Image Registration button 1505, the printing apparatus 107 performs print processing and the verification apparatus 109 scans the printed images for generating a correct answer image. Alternatively, the verification apparatus 109 may automatically issue an instruction to print N number of verification jobs to the external controller 102 via the communication cable 255 and the internal LAN 105 at the same time as when the Start Registration button 804 illustrated in FIG. 9 is selected. Likewise, also when a candidate correct answer image is additionally acquired as illustrated in FIGS. 12A and 12B, the verification apparatus 109 may issue an instruction to additionally print a specified page to the external controller 102 at the same as when the Start Acquisition button 1106 is selected.

A Start Printing button 1508 is used to issue an instruction to start printing the verification jobs. When an instruction to start the printing is issued using the Start Printing button 1508, the external controller 102 inputs the verification jobs to the printing apparatus 107 based on the settings illustrated in FIG. 16. When the user issues an instruction to start the verification to the verification apparatus 109 using the Start Verification button 707 illustrated in FIG. 8 and then issues an instruction to start printing the verification jobs to the external controller 102 using the Start Printing button 1508, the external controller 102 inputs the print data to the printing apparatus 107. The external controller 102 further issues an instruction to convey the print sheet subjected to printing to the verification apparatus 109. When the print sheet is conveyed to the verification apparatus 109, the verification apparatus 109 scans the image of the print sheet and performs the verification processing. Alternatively, the external controller 102 may instruct the verification apparatus 109 to start the verification at the same time as when the Start Printing button 1508 is selected to issue an instruction to start printing the verification jobs. In this case, the verification apparatus 109 may notify the external controller 102 of whether a correct answer image has been registered, to prevent the external controller 102 from starting the printing when no correct answer image is registered.

Figure 17:
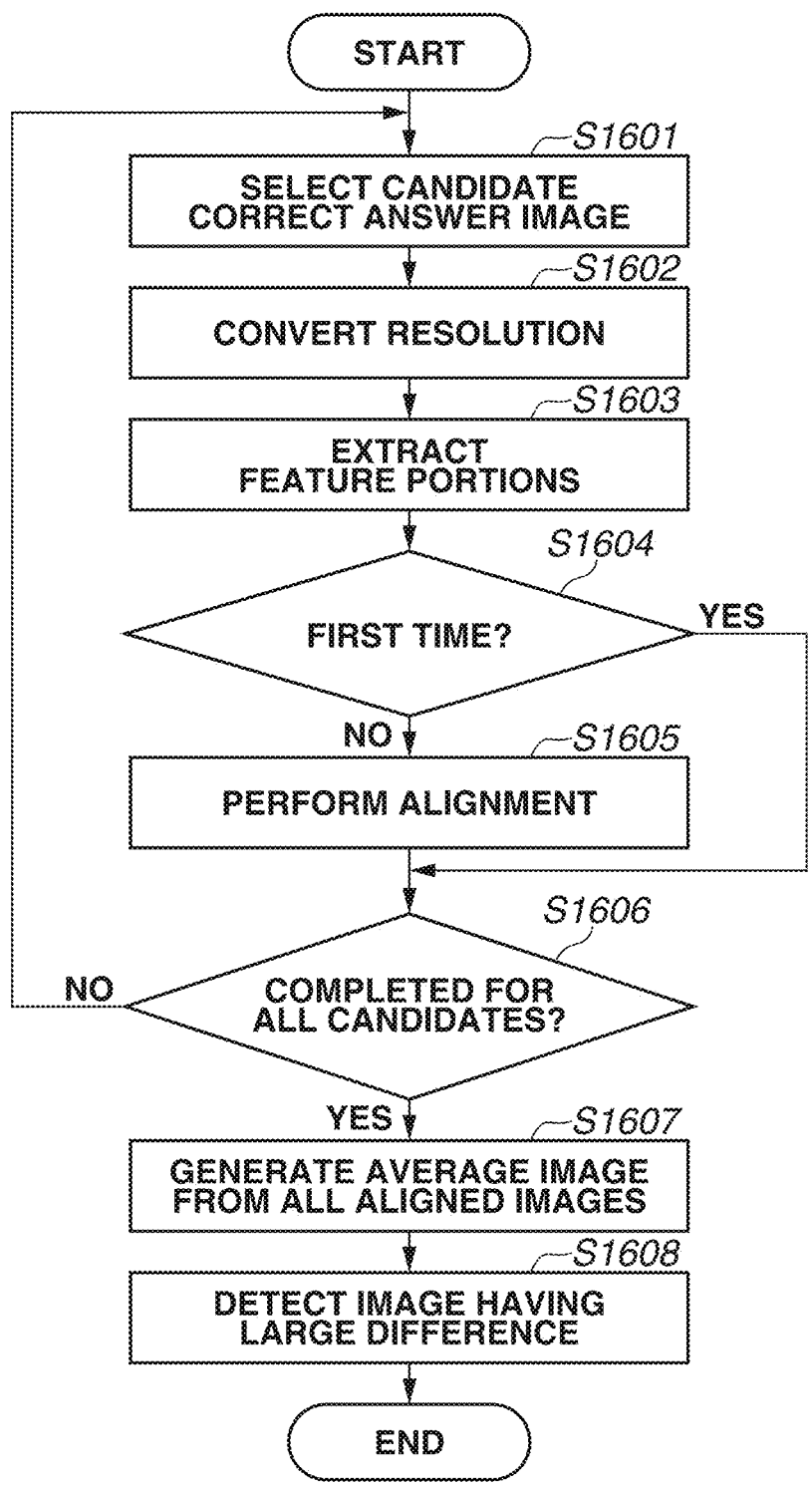
FIG. 17 is a flowchart illustrating information processing for detecting an image having a large difference as an exclusion candidate image from among a plurality of candidate correct answer images.

FIG. 17 is a flowchart illustrating processing for detecting an image having a large difference as an exclusion candidate image from among a plurality of candidate correct answer images. In the present exemplary embodiment, the number of candidate correct answer images is five, and the processing of the flowchart in FIG. 17 is performed by the CPU 238 of the verification apparatus 109. Data generated in the processing is stored in the memory 239. The processing of the flowchart is performed for each page to be verified.

In step S1601, the CPU 238 selects a first candidate correct answer image. In step S1601, the CPU 238 may select the first candidate correct answer image based on a user's instruction. In step S1602, the CPU 238 applies resolution conversion to the image data of the selected candidate correct answer image. For example, the CPU 238 converts the image data of the first candidate correct answer image with 1200 dots per inch (dpi) into first low-resolution image data with 300 dpi. The conversion into low-resolution image data may be desirable but not necessary if the resolution of the candidate correct answer image is higher than the resolution intended in this flowchart. In step S1603, the CPU 238 extracts feature portions from the first low-resolution image data. Because the extraction is performed to align a plurality of candidate correct answer images, it may be desirable that a plurality of feature portions is extracted and the extracted feature portions are dispersed over the entire image. Alternatively, the CPU 238 may extract alignment marks included at the four corners of the image.

In step S1605, the CPU 238 transforms the second and subsequent low-resolution image data so that the target pixels are aligned with those of the first low-resolution image data. The CPU 238 does not process the first low-resolution data and stores the data in the memory 239 as first aligned image data. In other words, the CPU 238 skips step S1605 in the case of the first low-resolution image data. The processing for transforming the second and subsequent low-resolution image data for alignment may be, for example, affine transformation. Thus, the CPU 238 acquires parameters for affine transformation through an algorithm based on the relationships between the feature portion positions of the current low-resolution image data and the corresponding feature portion positions of the first low-resolution image data. Then, the CPU 238 applies affine transformation to the current low-resolution image data by using the parameters. For example, the CPU 238 stores the resulting image data in the memory 239 as second aligned data. In the transformation processing in this step, the CPU 238 may perform non-linear transformation to correct a distortion specific to each image.

In step S1606, the CPU 238 determines whether the processing from steps S1601 to S1605 is completed for all the candidate correct answer images. When the processing is completed for all the candidate correct answer images (YES in step S1606), the processing proceeds to step S1607. In step S1607, the CPU 238 acquires an average image of the first to fifth aligned images. The CPU 238 is to generate the average image by acquiring the average values of the pixel values of the respective corresponding pixels of the aligned images. In step S1608, the CPU 238 calculates the difference between the average image and each of the first to fifth aligned images to detect an image having a large difference. Alternatively, in step S1608, the CPU 238 may calculate the difference between the first candidate correct answer image selected in step S1601 and each of the second to fifth aligned images to detect an image having a large difference.

Figure 18:
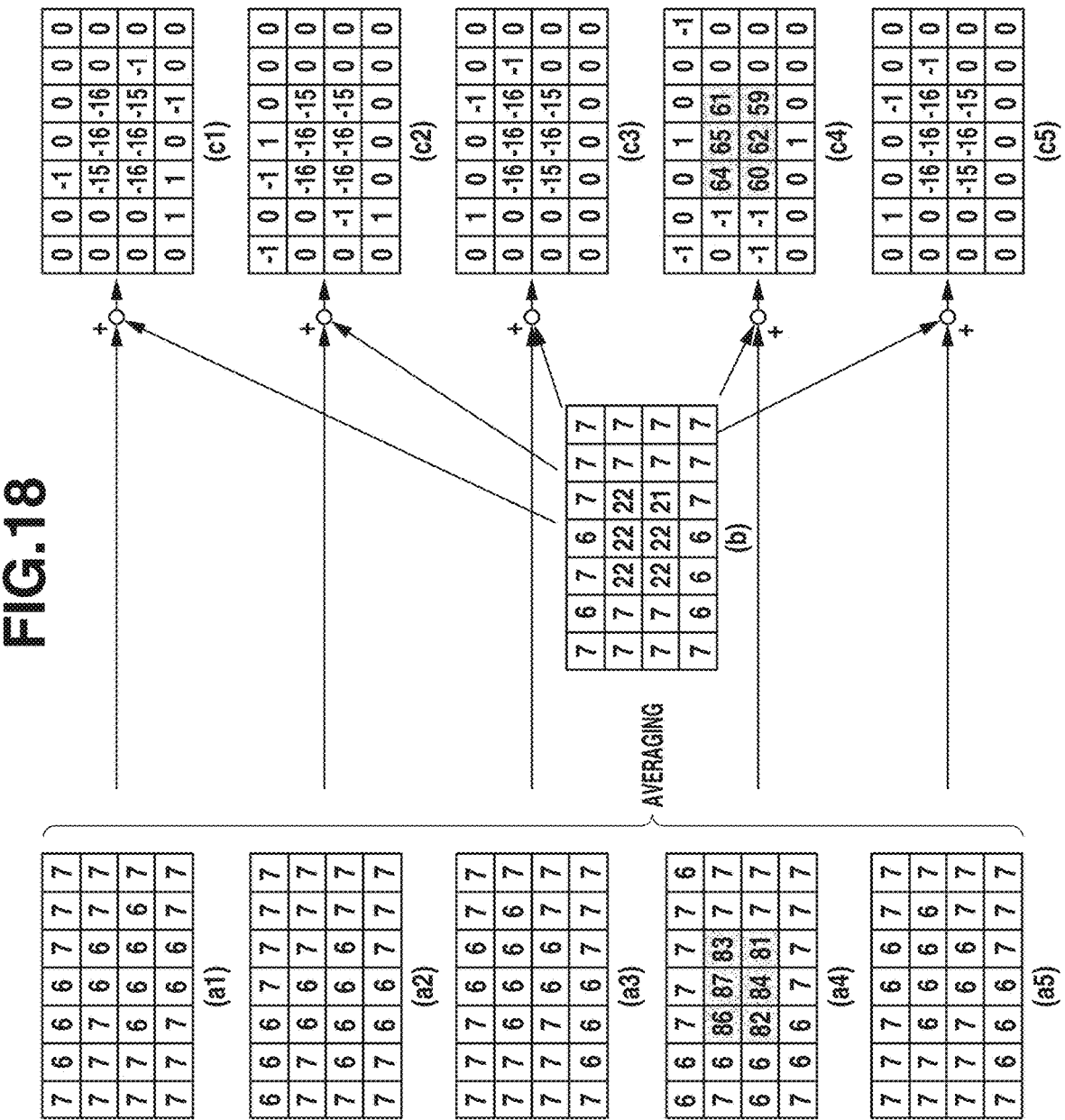
FIG. 18 is a diagram illustrating pixel values of respective corresponding regions of first, second, third, fourth, and fifth aligned images.

FIG. 18 illustrates a specific example. FIG. 18 illustrates pixel values of corresponding regions (a1), (a2), (a3), (a4), and (a5) in the first, second, third, fourth, and fifth aligned images, respectively. In this example, it is assumed that only the gray portion of the region (a4) has large pixel values because of a defect. An average image (b) is generated in step S1607 by acquiring the average values of the pixel values of the corresponding pixels. Images (c1), (c2), (c3), (c4), and (c5) are further acquired by subtracting each pixel value of the average image (b) from the corresponding pixel value of each of the regions (a1), (a2), (a3), (a4), and (a5), respectively. If the absolute value of the difference between the pixel values exceeds a predetermined value, the CPU 238 determines the pixel to be defective. The threshold value is, for example, 50. In this case, the CPU 238 determines the pixels in the gray portion of the image (c4) to be defective. In step S1608, the CPU 238 detects the fourth candidate correct answer image corresponding to the image (c4) including the defective pixels, as an image having a large difference. Then, the processing ends.

While, in the present exemplary embodiment, the CPU 238 determines the fourth candidate correct answer image as an image having a large difference immediately after detection of defective pixels, the processing is not limited thereto. The CPU 238 may ignore a small difference according to the following rule. For example, the CPU 238 ignores the difference if a defective pixel is isolated or if the number of defective pixels is equal to or less than a specific number in a region. For example, the CPU 238 ignores the difference if the number of defective pixels is equal to or less than a predetermined number in a page. While, in the present exemplary embodiment, an average image is generated and then the differences from the average image are numerically represented, the average image does not necessarily are to be acquired. For example, after statistically analyzing variations between the corresponding pixels, a pixel having a deviation value exceeding a predetermined value may be determined to be defective.

As described above, in the present exemplary embodiment, a group of candidate correct answer images can be acquired with higher accuracy. More specifically, by applying the processing in step S511 to candidate correct answer images, a defective image that is difficult to be detected in the defective image detection processing performed in step S504 can be excluded from the candidate correct answer images.

Figure 19:
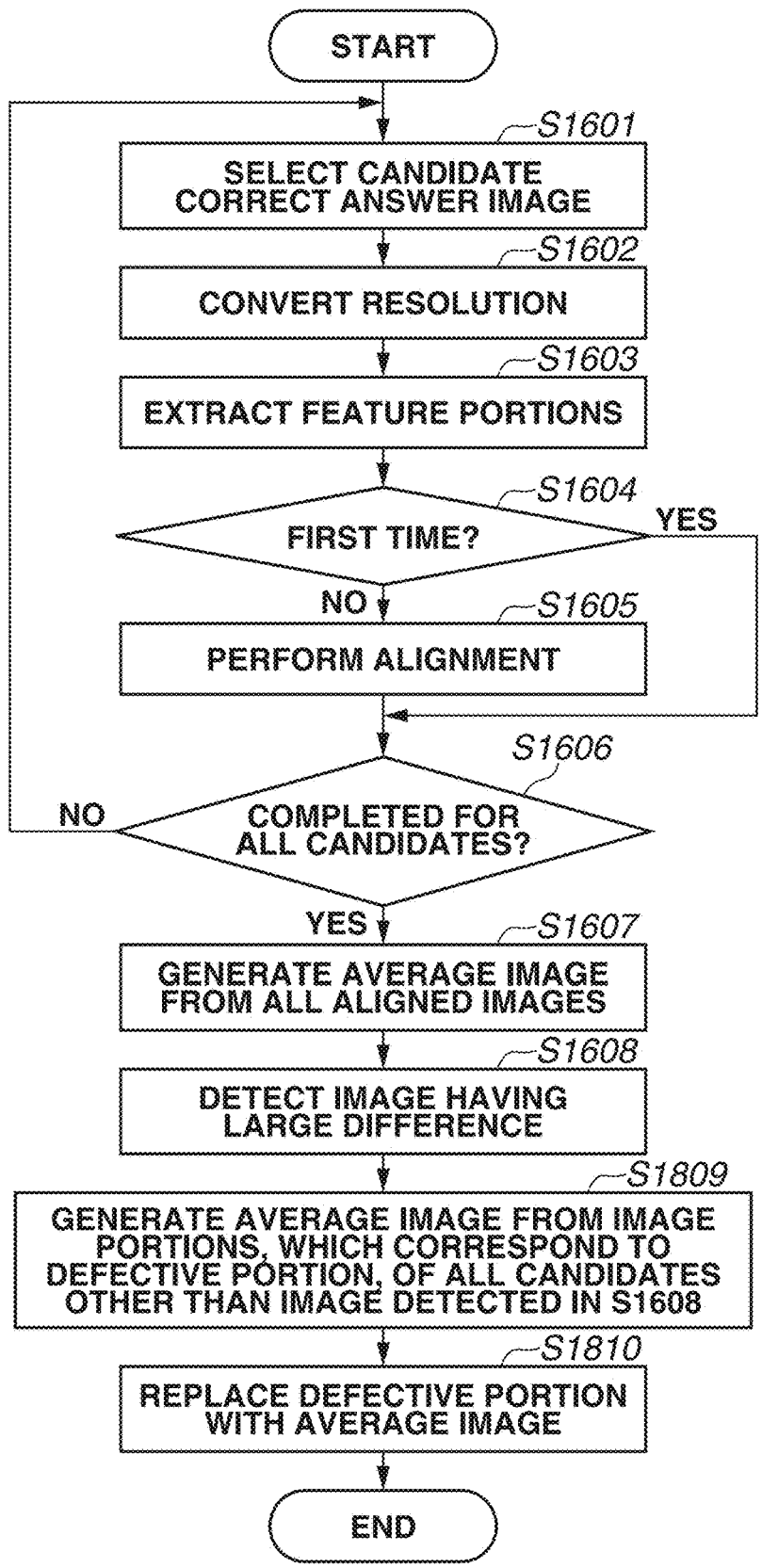
FIG. 19 is a flowchart according to a first modification example, which illustrates information processing for detecting an image having a large difference as an exclusion candidate image from among a plurality of candidate correct answer images.

A first modification example will be described next. In the first exemplary embodiment, when an exclusion candidate image is detected in step S511, the CPU 238 excludes the image on a page basis. In the first modification example, the CPU 238 excludes only a defective portion from the image to maintain the number of candidate correct answer images. The first modification example differs from the first exemplary embodiment in the processing for detecting an image having a large difference from among the candidate correct answer images, which has been described above with reference to FIG. 17. FIG. 19 illustrates the processing performed by the verification apparatus 109 when a correct answer image is registered, according to the first modification example. The processing will be described next with reference to FIG. 19. The processing in FIG. 19 is performed by the CPU 238 of the verification apparatus 109.

Figure 20:
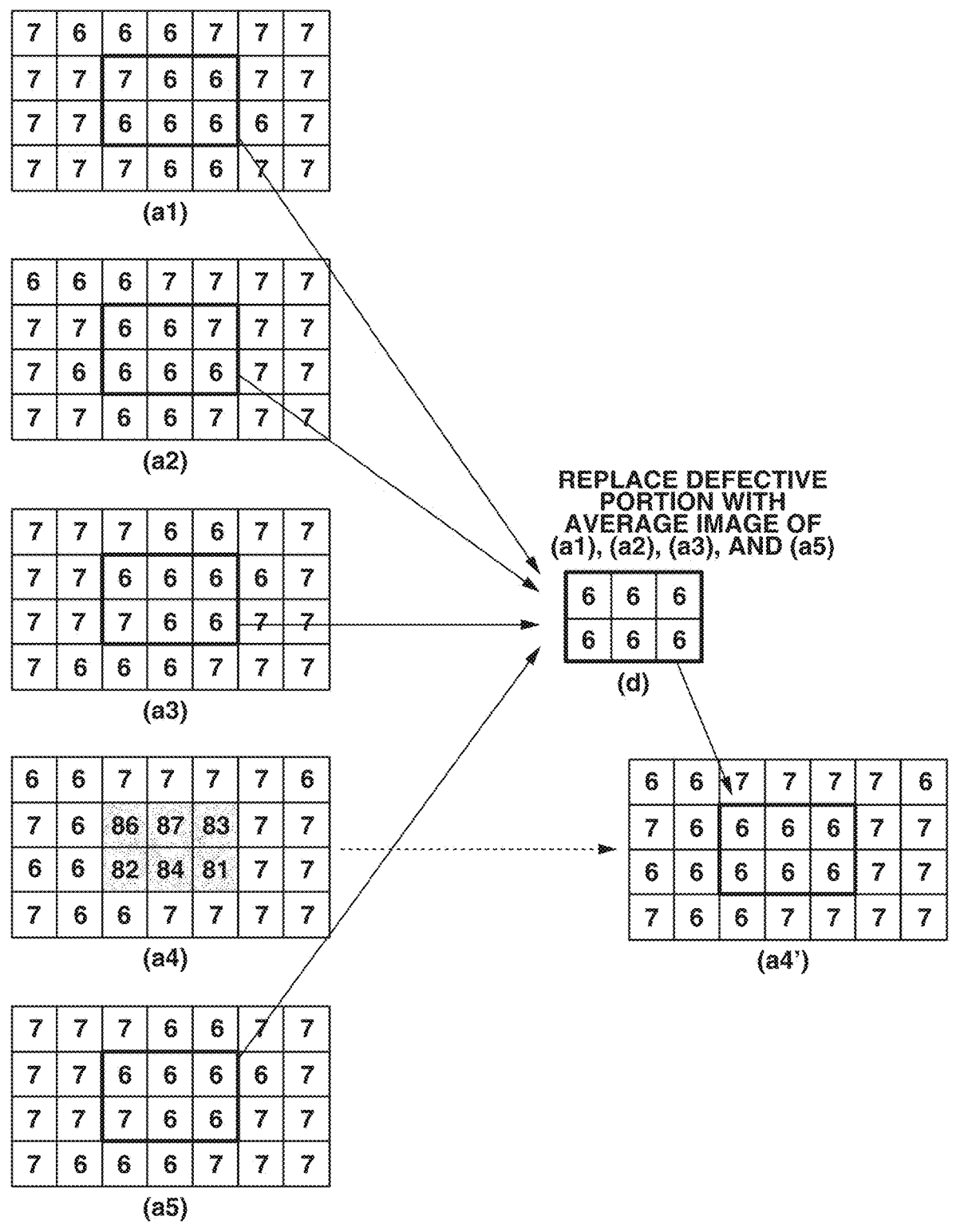

Steps S1601 to S1608 in FIG. 19 are similar to steps S1601 to S1608 in FIG. 17 according to the first exemplary embodiment. The subsequent processing will be described next with reference to a specific example illustrated in FIG. 20. Images (a1) to (a5) illustrated in FIG. 20 indicate the regions (a1) to (a5) illustrated in FIG. 18, respectively. More specifically, the gray portion of the image (a4) illustrated in FIG. 20 has pixel values that do not satisfy the threshold value of 50 and is determined to be defective. In the first modification example, in step S1809, the CPU 238 further calculates an average image from the image portions, which correspond to the above-described defective portion, of the images other than the image (a4). More specifically, the CPU 238 acquires an average image (d) of the images (a1), (a2), (a3), and (a5).

In step S1810, the CPU 238 replaces the defective portion of the image (a4) with the average image (d) to acquire an image (a4'). The fourth aligned image including the image (a4) is replaced with the fourth aligned image including the image (a4'). Thus, the fourth aligned image is not an exclusion candidate image, and five aligned images are acquired as candidate correct answer images. The five aligned images as candidate correct answer images are superimposed and averaged, and the resultant image is used as a correct answer image. In the first modification example, verification is performed by subjecting each image to be verified to the same resolution conversion as that in step S1602 (with the same ratio as that in step S1602) and the same alignment processing as that in step S1605, and then comparing the resultant image with the correct answer image. The processing in step S1810 is an example of processing for replacing part of the candidate correct answer image to be excluded with another image.

According to the first modification example, the number of candidate correct answer images can be maintained. According to the exemplary embodiments of the disclosure, whether a defective image occurs can be reliably determined when images to be used for generating a correct answer image are acquired.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc. All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-017729, filed Feb. 5, 2020, which is hereby incorporated by reference herein in its entirety.

What is claimed is:

1. An inspection system comprising:
a scanning unit configured to scan an image printed on a plurality of recording sheets;
an acquisition unit configured to acquire a plurality of candidate reference images obtained by scanning the image by the scanning unit;
a generation unit configured to generate a candidate average reference image obtained by averaging the plurality of candidate reference images;
a specification unit configured to specify a candidate reference image that includes a pixel at which an absolute value of a difference between a pixel value of the candidate reference image and a corresponding pixel value of the candidate average reference image exceeds a predetermined value, wherein a comparison for the difference is made for each of the plurality of candidate reference images; and
an inspection unit configured to inspect an inspection target image by using a reference image generated from a plurality of candidate reference images excluding the specified candidate reference image.

2. The inspection system according to claim 1, further comprising a display unit configured to display a screen including the detected candidate correct answer image.

3. The inspection system according to claim 2, further comprising an exclusion unit configured to exclude the detected candidate correct answer image from the acquired plurality of candidate correct answer images, based on a user's instruction via the screen.

4. The inspection system according to claim 1, further comprising a replacement unit configured to replace a part of the detected candidate correct answer image with another image.

5. The inspection system according to claim 1, wherein the specification unit performs processing that includes comparing a value of a first pixel located at a first position of the candidate reference image with a value of a second pixel located at the first position of the candidate average reference image and determining whether or not an absolute value of a difference between the value of the first pixel and the value of the second pixel exceeds the predetermined value.

6. The inspection system according to claim 1, further comprising:
a display unit; and
a display control unit that causes the display unit to display that the absolute value of the difference exceeds the predetermined value.

7. A method performed by an inspection system, the method comprising:
scanning an image printed on a plurality of recording sheets;
acquiring a plurality of candidate reference images obtained by scanning the image;
generating a candidate average reference image obtained by averaging the plurality of candidate reference images;
specifying a candidate reference image that includes a pixel at which an absolute value of a difference between a pixel value of the candidate reference image and a corresponding pixel value of the candidate average reference image exceeds a predetermined value, wherein a comparison for the difference is made for each of the plurality of candidate reference images; and
inspecting an inspection target image by using a reference image generated from a plurality of candidate reference images excluding the specified candidate reference image.

8. The method according to claim 7, further comprising displaying a screen including the detected candidate correct answer image.

9. The method according to claim 8, further comprising excluding the detected candidate correct answer image from the acquired plurality of candidate correct answer images, based on a user's instruction via the screen.

10. The method according to claim 7, further comprising replacing a part of the detected candidate correct answer image with another image.

11. The method according to claim 7, wherein the specifying includes processing that includes comparing a value of a first pixel located at a first position of the candidate reference image with a value of a second pixel located at the first position of the candidate average reference image and determining whether or not an absolute value of a difference between the value of the first pixel and the value of the second pixel exceeds the predetermined value.

12. The method according to claim 7, further comprising: causing a display unit to display that the absolute value of the difference exceeds the predetermined value.

13. A non-transitory computer-readable storage medium storing a program for causing a computer to execute a method performed by an inspection system, the method comprising:

acquiring a plurality of candidate reference images obtained by scanning the image;

generating a candidate average reference image obtained by averaging the plurality of candidate reference images;

specifying a candidate reference image that includes a pixel at which an absolute value of a difference between a pixel value of the candidate reference image and a corresponding pixel value of the candidate average reference image exceeds a predetermined value, wherein a comparison for the difference is made for each of the plurality of candidate reference images; and inspecting an inspection target image by using a reference image generated from a plurality of candidate reference images excluding the specified candidate reference image.

14. The non-transitory computer-readable storage medium according to claim 13, further comprising displaying a screen including the detected candidate correct answer image.

15. The non-transitory computer-readable storage medium according to claim 14, further comprising excluding the detected candidate correct answer image from the acquired plurality of candidate correct answer images, based on a user's instruction via the screen.

16. The non-transitory computer-readable storage medium according to claim 13, further comprising replacing a part of the detected candidate correct answer image with another image.

* * * * *